US012755894B2

(12) United States Patent
Ono et al.

(10) Patent No.: US 12,755,894 B2
(45) Date of Patent: Oct. 6, 2026

(54) MULTILAYER-TYPE COIL COMPONENT

(71) Applicant: Murata Manufacturing Co., Ltd., Kyoto-fu (JP)

(72) Inventors: Kouta Ono, Nagaokakyo (JP); Kouhei Matsuura, Nagaokakyo (JP); Tomoyuki Sato, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 893 days.

(21) Appl. No.: 18/060,409

(22) Filed: Nov. 30, 2022

(65) Prior Publication Data

US 2023/0178293 A1 Jun. 8, 2023

(30) Foreign Application Priority Data

Dec. 8, 2021 (JP) ................................ 2021-199382

(51) Int. Cl.
*H01F 27/28* (2006.01)
*H01F 27/32* (2006.01)
*H01F 41/12* (2006.01)

(52) U.S. Cl.
CPC ....... *H01F 27/323* (2013.01); *H01F 27/2804* (2013.01); *H01F 41/122* (2013.01); *H01F 2027/2809* (2013.01)

(58) Field of Classification Search
CPC ......... H01F 27/2804; H01F 2027/2809; H01F 17/0013; H01F 17/0006; H01F 5/003
USPC ................................................ 336/200, 232
See application file for complete search history.

(56) References Cited

U.S. PATENT DOCUMENTS 6,218,925 B1 * 4/2001 Iwao .................... H01F 27/292 336/200
2016/0042860 A1 * 2/2016 Choi .................. H01F 17/0013 336/200
2019/0244741 A1 * 8/2019 Murakami .......... H01F 17/0013
2019/0348212 A1 * 11/2019 Tozawa .................. H01F 27/29
2020/0083587 A1 3/2020 Matsushita et al.
2020/0152365 A1 * 5/2020 Matsuura ................ C04B 35/00

FOREIGN PATENT DOCUMENTS

JP H04123405 A * 4/1992
JP H0855726 A * 2/1996 ......... H01F 17/0013
JP 2006352568 A * 12/2006

(Continued)

*Primary Examiner* — Tszfung J Chan
(74) *Attorney, Agent, or Firm* — Studebaker Brackett PLLC

(57) ABSTRACT

A multilayer-type coil component including an element body including insulating layers laminated in a laminating direction; first and second coils inside the element body and insulated from each other; first and second outer electrodes on a surface of the element body and electrically connected to the first coil; third and fourth outer electrodes on the surface of the element body and electrically connected to the second coil. The laminating direction, and respective directions of coil axes of the first and second coils are parallel to a mount surface of the element body along a same direction. The first and second coils include first and second coil conductors, respectively, laminated in the laminating direction. Each of the first coil conductors has a length smaller than one turn of the first coil. Each of the second coil conductors has a length smaller than one turn of the second coil.

19 Claims, 11 Drawing Sheets

(56) References Cited

FOREIGN PATENT DOCUMENTS

| | | | | | |
|---|---|---|---|---|---|
| JP | 2009-021453 | A | | 1/2009 | |
| JP | 2012-049696 | A | | 3/2012 | |
| JP | 2012-248917 | A | | 12/2012 | |
| JP | 2013-077849 | A | | 4/2013 | |
| JP | 2014-027072 | A | | 2/2014 | |
| JP | 2019-140170 | A | | 8/2019 | |
| JP | 2019-186255 | A | | 10/2019 | |
| WO | WO-2018212273 | A1 | * | 11/2018 | .............. H01P 5/184 |

* cited by examiner

MULTILAYER-TYPE COIL COMPONENT

CROSS-REFERENCE TO RELATED APPLICATIONS

Cross-Reference to Related Application

This application claims benefit of priority to Japanese Patent Application No. 2021-199382, filed Dec. 8, 2021, the entire content of which is incorporated herein by reference.

BACKGROUND

Technical Field

The present disclosure relates to a multilayer-type coil component.

Background Art

As a common mode choke coil, which is one type of a circuit noise filter, a common mode noise filter is disclosed in Japanese Unexamined Patent Application Publication No. 2014-27072. The common mode noise filter includes a plurality of insulator layers; a first coil and a second coil which are formed in the insulator layers; a multilayer body configured by laminating the plurality of insulator layers, the first coil, and the second coil; first and second inner electrodes formed so as to penetrate through at least two corners of four corners of an insulator layer positioned on one outermost layer of the plurality of insulator layers; third and fourth inner electrodes formed so as to penetrate through at least two corners of four corners of an insulator layer positioned on the other outermost layer of the plurality of insulator layers; first and second outer electrodes formed on one end face of the multilayer body; and third and fourth outer electrodes formed on the other end face of the multilayer body. Mounting is conducted so that a laminating direction of the multilayer body and a mount surface are parallel. One end portion of the first coil and the first inner electrode or the first outer electrode are connected, the other end portion of the first coil and the third inner electrode or the third outer electrode are connected, one end portion of the second coil and the second inner electrode or the second outer electrode are connected, and the other end portion of the second coil and the fourth inner electrode or the fourth outer electrode are connected. Furthermore, the first outer electrode and the first inner electrode are connected, the second outer electrode and the second inner electrode are connected, the third outer electrode and the third inner electrode are connected, and the fourth outer electrode and the fourth inner electrode are connected.

SUMMARY

However, in the common mode noise filter described in Japanese Unexamined Patent Application Publication No. 2014-27072, as depicted in FIG. 2 and so forth therein, the first coil and the second coil are each configured of a spiral-shaped conductor. Thus, the area where conductors overlap when viewed from the laminating direction is large. In turn, the area where the coils overlap is large. Thus, in the common mode noise filter described in Japanese Unexamined Patent Application Publication No. 2014-27072, stray capacitance is large and, as a result, a problem of decreasing high frequency characteristics occurs.

Accordingly, the present disclosure provides a multilayer-type coil component that is excellent in high frequency characteristics.

A multilayer-type coil component according to the present disclosure includes an element body formed with a plurality of insulating layers laminated in a laminating direction; a first coil provided inside the element body; a second coil provided inside the element body and insulated from the first coil; a first outer electrode provided on a surface of the element body and electrically connected to the first coil; a second outer electrode provided on the surface of the element body and electrically connected to the first coil; a third outer electrode provided on the surface of the element body and electrically connected to the second coil; and a fourth outer electrode provided on the surface of the element body and electrically connected to the second coil. The laminating direction, a direction of a coil axis of the first coil, and a direction of a coil axis of the second coil are parallel to a mount surface of the element body along a same direction. The first coil is formed with a plurality of first coil conductors laminated in the laminating direction being electrically connected. Each of the first coil conductors has a length smaller than one turn of the first coil. The second coil is formed with a plurality of second coil conductors laminated in the laminating direction being electrically connected. Each of the second coil conductors has a length smaller than one turn of the second coil.

According to the present disclosure, a multilayer-type coil component that is excellent in high frequency characteristics can be provided.

DETAILED DESCRIPTION

A multilayer-type coil component of the present disclosure is described below. Note that the present disclosure is not limited to the following structure and may be changed as appropriate in a scope not deviating from the gist of the present disclosure. Also, the present disclosure also includes one obtained by combining a plurality of individual preferable structures described below.

Each embodiment described below is an example, and it goes without saying that partial replacement or combination of structures described in different embodiments is possible. In Embodiment 2 onward, description about matters common to Embodiment 1 is omitted and a different point is mainly described. In particular, similar operations and effects by similar structures are not sequentially mentioned for each embodiment.

In the description below, when the embodiments are not particularly distinguished from one another, the disclosure is simply referred to as the "multilayer-type coil component of the present disclosure".

The drawings depicted below are schematic views, and their dimensions, scale of the aspect ratio, and so forth may be different from those of an actual product.

Embodiment 1

The multilayer-type coil component of the present disclosure includes an element body formed with a plurality of insulating layers laminated in a laminating direction, a first coil provided inside the element body, a second coil provided inside the element body and insulated from the first coil, a first outer electrode provided on a surface of the element body and electrically connected to the first coil, a second outer electrode provided on the surface of the element body and electrically connected to the first coil, a third outer electrode provided on the surface of the element body and electrically connected to the second coil, and a fourth outer electrode provided on the surface of the element body and electrically connected to the second coil.

Figure 1:
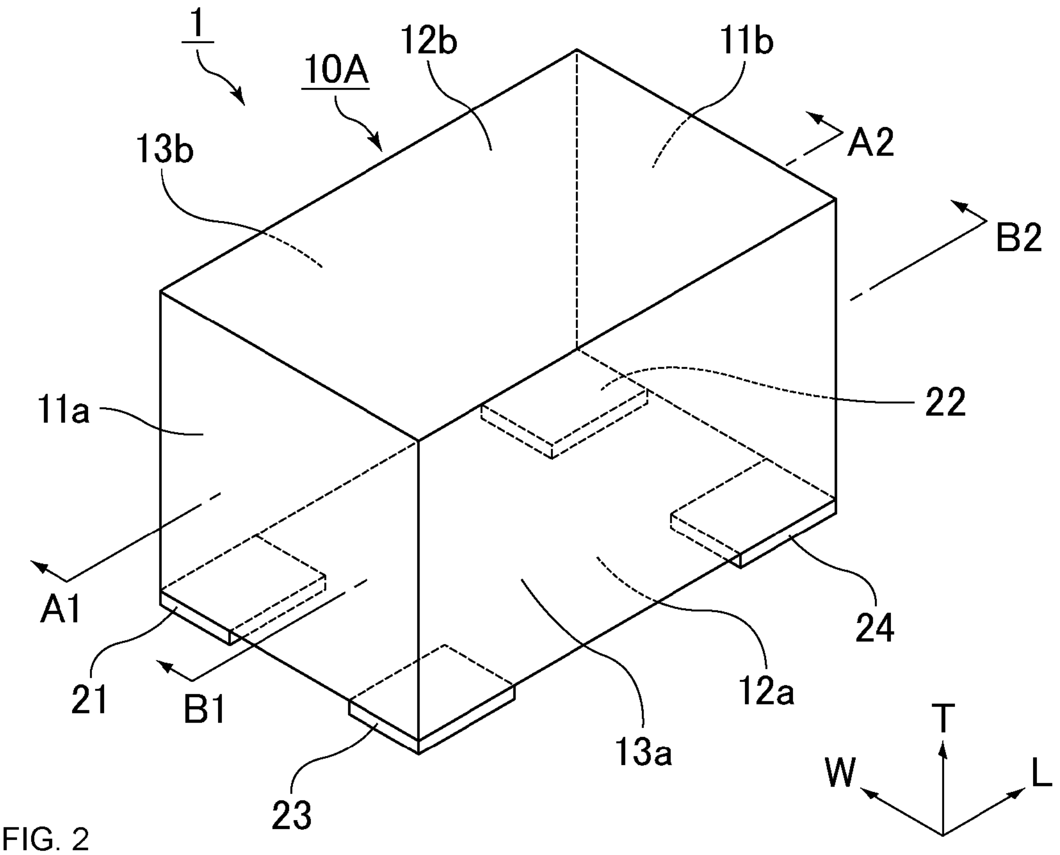
FIG. 1 is a perspective schematic view depicting one example of a multilayer-type coil component of Embodiment 1 of the present disclosure.
Figure 2:
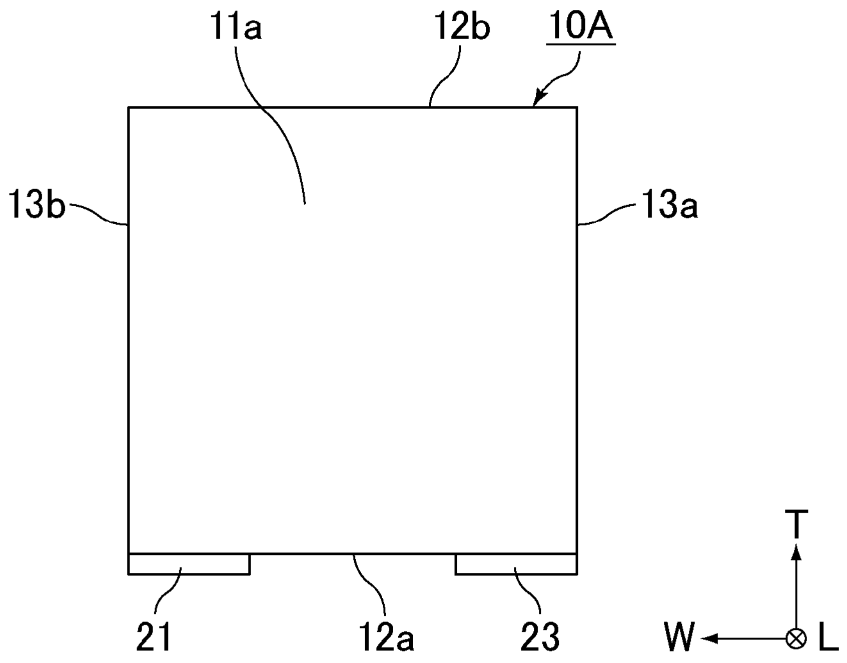
FIG. 2 is a plan schematic view depicting the multilayer-type coil component depicted in FIG. 1 when viewed from a first end face side of an element body.
Figure 3:
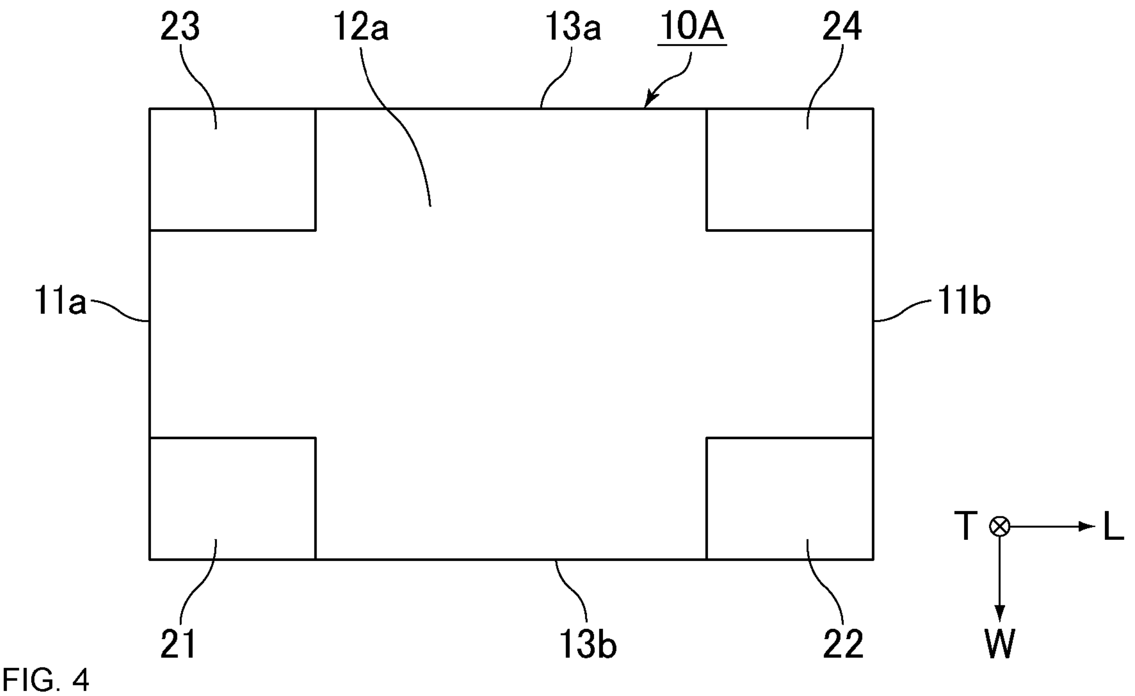
FIG. 3 is a plan schematic view depicting the multilayer-type coil component depicted in FIG. 1 when viewed from a first principal surface side of the element body.
Figure 4:
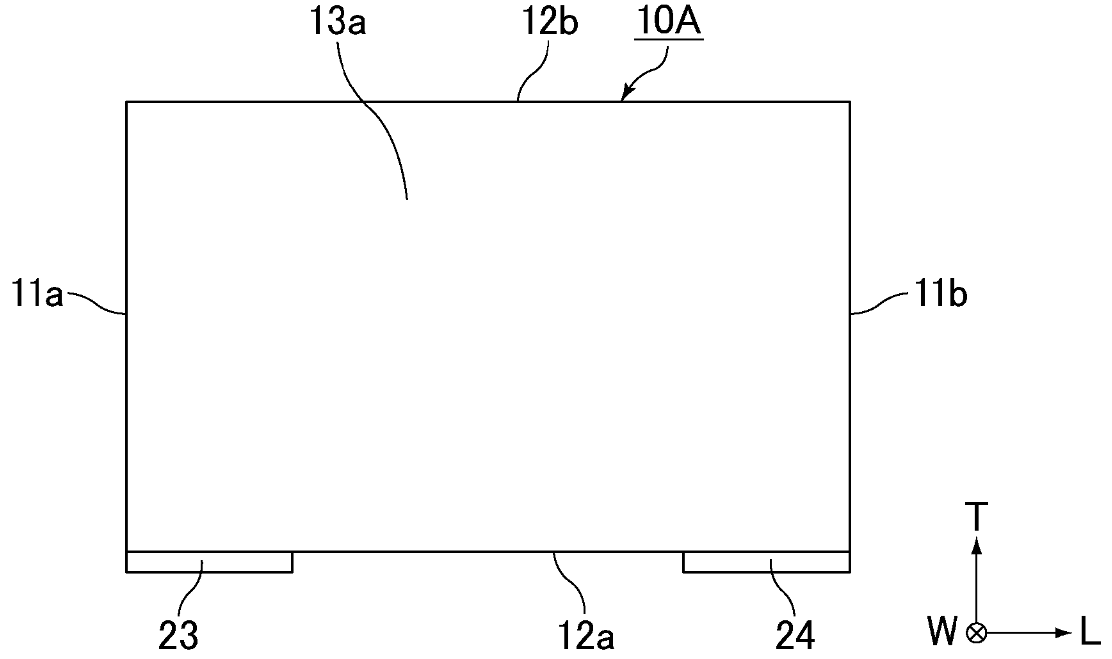
FIG. 4 is a plan schematic view depicting the multilayer-type coil component depicted in FIG. 1 when viewed from a first side surface side of the element body.

FIG. 1 is a perspective schematic view depicting one example of a multilayer-type coil component of Embodiment 1 of the present disclosure. FIG. 2 is a plan schematic view depicting the multilayer-type coil component depicted in FIG. 1 when viewed from a first end face side of an element body. FIG. 3 is a plan schematic view depicting the multilayer-type coil component depicted in FIG. 1 when viewed from a first principal surface side of the element body. FIG. 4 is a plan schematic view depicting the multilayer-type coil component depicted in FIG. 1 when viewed from a first side surface side of the element body.

A multilayer-type coil component 1 depicted in FIG. 1, FIG. 2, FIG. 3, and FIG. 4 has an element body 10A, a first outer electrode 21, a second outer electrode 22, a third outer electrode 23, and a fourth outer electrode 24. Although not depicted in FIG. 1, FIG. 2, FIG. 3, and FIG. 4, as will be described further below, the multilayer-type coil component 1 also has a first coil and a second coil provided inside the element body 10A.

The multilayer-type coil component 1 is also called a common mode choke coil, which is one type of a circuit noise filter.

In the specification, a length direction, a height direction, and a width direction are taken as directions defined by L, T, and W, respectively, as depicted in FIG. 1 and so forth. Here, the length direction L, the height direction T, and the width direction W are orthogonal to one another.

The element body 10A has a first end face 11*a* and a second end face 11*b* opposed to each other in the length direction L, a first principal surface 12*a* and a second principal surface 12*b* opposed to each other in the height direction T, and a first side surface 13*a* and a second side surface 13*b* opposed to each other in the width direction W, and has, for example, a rectangular parallelepiped shape or a substantially rectangular parallelepiped shape.

The first end face 11*a* and the second end face 11*b* of the element body 10A are not required to be strictly orthogonal to each other in the length direction L. Also, the first principal surface 12*a* and the second principal surface 12*b* of the element body 10A are not required to be strictly orthogonal to each other in the height direction T. Furthermore, the first side surface 13*a* and the second side surface 13*b* of the element body 10A are not required to be strictly orthogonal to each other in the width direction W.

When the multilayer-type coil component 1 is mounted on a substrate, the first principal surface 12*a* of the element body 10A serves as a mount surface. Note that the mount surface of the multilayer-type coil component 1 refers to the first principal surface 12*a* where the first outer electrode, the second outer electrode, the third outer electrode, and the fourth outer electrode are provided in the element body 10A.

The element body 10A preferably has corner portions and ridge portions rounded. Each corner portion of the element body 10A is a portion where three surfaces of the element body 10A cross. Each ridge portion of the element body 10A is a portion where two surfaces of the element body 10A cross.

The first outer electrode 21 is provided on the surface of the element body 10A. In the example depicted in FIG. 1 and FIG. 3, the first outer electrode 21 is provided on the first principal surface 12*a* of the element body 10A. More specifically, the first outer electrode 21 is provided on a part of the first principal surface 12*a* of the element body 10A, the part being a region including a ridge portion crossing the first end face 11*a*, a ridge portion crossing the second side surface 13*b*, and a corner portion crossing the first end face 11*a* and the second side surface 13*b*.

The first outer electrode 21 may extend from a part of the first principal surface 12*a* of the element body 10A over a part of the first end face 11*a* and a part of the second side surface 13*b*.

The second outer electrode 22 is provided on the surface of the element body 10A. In the example depicted in FIG. 1 and FIG. 3, the second outer electrode 22 is provided on the first principal surface 12*a* of the element body 10A. More specifically, the second outer electrode 22 is provided on a part of the first principal surface 12*a* of the element body 10A, the part being a region including a ridge portion crossing the second end face 11*b*, a ridge portion crossing the second side surface 13*b*, and a corner portion crossing the second end face 11*b* and the second side surface 13*b*.

The second outer electrode 22 may extend from a part of the first principal surface 12*a* of the element body 10A over a part of the second end face 11*b* and a part of the second side surface 13*b*.

The third outer electrode 23 is provided on the surface of the element body 10A. In the example depicted in FIG. 1 and FIG. 3, the third outer electrode 23 is provided on the first principal surface 12*a* of the element body 10A. More specifically, the third outer electrode 23 is provided on a part of the first principal surface 12*a* of the element body 10A, the part being a region including a ridge portion crossing the first end face 11*a*, a ridge portion crossing the first side surface 13*a*, and a corner portion crossing the first end face 11*a* and the first side surface 13*a*.

The third outer electrode 23 may extend from a part of the first principal surface 12*a* of the element body 10A over a part of the first end face 11*a* and a part of the first side surface 13*a*.

The fourth outer electrode 24 is provided on the surface of the element body 10A. In the example depicted in FIG. 1 and FIG. 3, the fourth outer electrode 24 is provided on the first principal surface 12*a* of the element body 10A. More specifically, the fourth outer electrode 24 is provided on a part of the first principal surface 12*a* of the element body 10A, the part being a region including a ridge portion crossing the second end face 11*b*, a ridge portion crossing the first side surface 13*a*, and a corner portion crossing the second end face 11*b* and the first side surface 13*a*.

The fourth outer electrode 24 may extend from a part of the first principal surface 12*a* of the element body 10A over a part of the second end face 11*b* and a part of the first side surface 13*a*.

As described above, in the example depicted in FIG. 1 and FIG. 3, the first outer electrode 21, the second outer electrode 22, the third outer electrode 23, and the fourth outer electrode 24 are provided as separated from one another on the first principal surface 12*a* of the element body 10A. More specifically, the first outer electrode 21 and the second outer electrode 22 are provided as separated in the length direction L. The third outer electrode 23 and the fourth outer electrode 24 are provided as separated in the length direction L. The first outer electrode 21 and the third outer electrode 23 are provided as separated in the width direction W. The second outer electrode 22 and the fourth outer electrode 24 are provided as separated in the width direction W.

As described above, since the first outer electrode 21, the second outer electrode 22, the third outer electrode 23, and the fourth outer electrode 24 are provided on the first principal surface 12*a* of the element body 10A as a mount surface, mountability of the multilayer-type coil component 1 is improved.

Each of the first outer electrode 21, the second outer electrode 22, the third outer electrode 23, and the fourth outer electrode 24 may have a single-layer structure or a multiple-layer structure.

When each of first outer electrode 21, the second outer electrode 22, the third outer electrode 23, and the fourth outer electrode 24 has a single-layer structure, the constituent material of each outer electrode can be, for example, Ag, Au, Cu, Pd, Ni, Al, an alloy containing at least one of these metals, or the like.

When each of first outer electrode 21, the second outer electrode 22, the third outer electrode 23, and the fourth outer electrode 24 has a multiple-layer structure, each outer electrode may have, for example, a base electrode layer containing Ag, a Ni-plated layer, and a Sn-plated layer, sequentially from a front surface side of the element body 10A.

Figure 5:
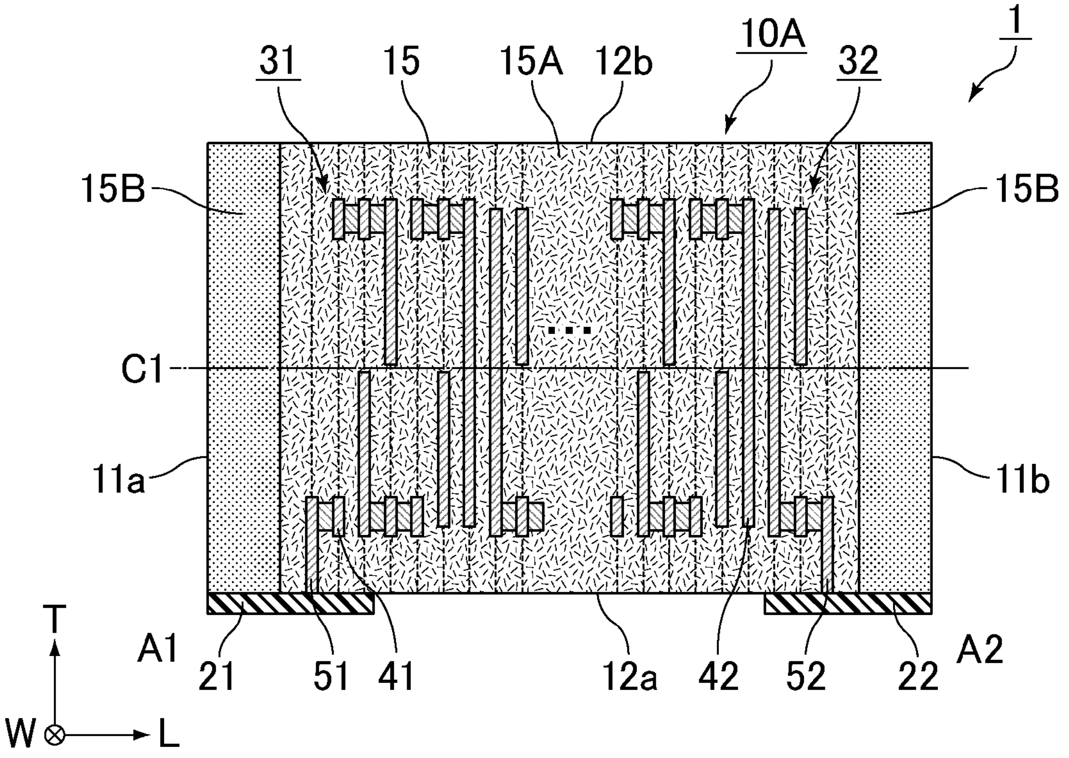
FIG. 5 is a sectional schematic view depicting a cross section of the multilayer-type coil component depicted in FIG. 1 along a line segment A1-A2.
Figure 6:
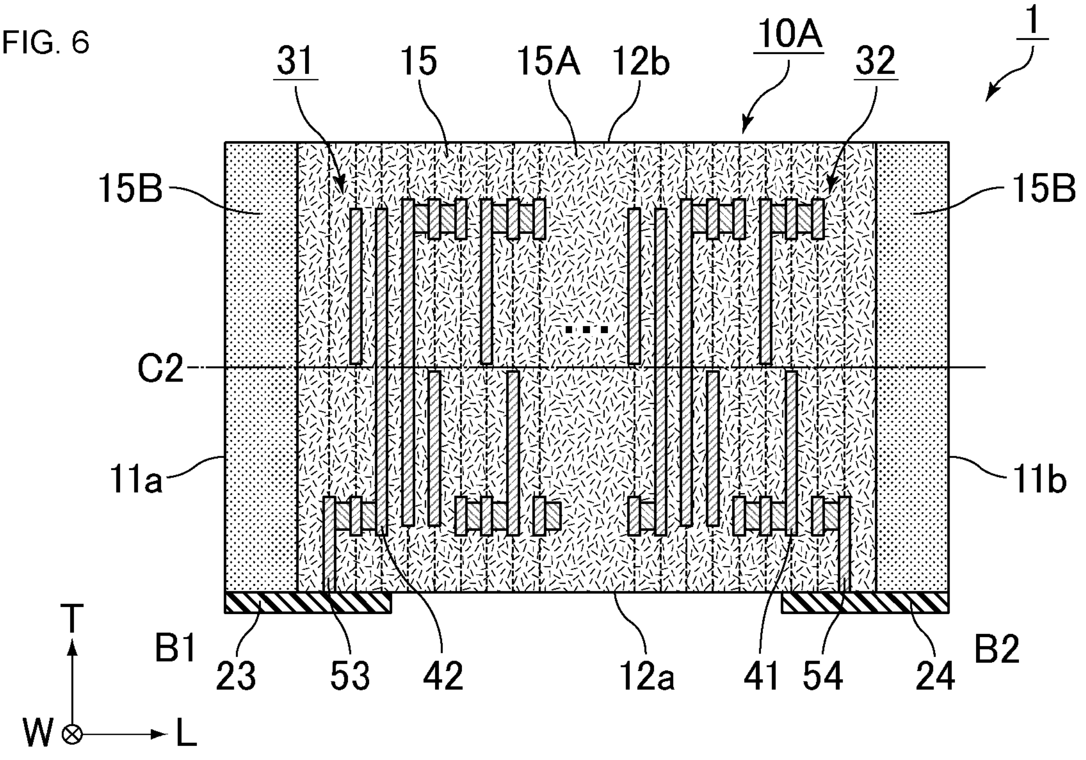
FIG. 6 is a sectional schematic view depicting a cross section of the multilayer-type coil component depicted in FIG. 1 along a line segment B1-B2.

FIG. 5 is a sectional schematic view depicting a cross section of the multilayer-type coil component depicted in FIG. 1 along a line segment A1-A2. FIG. 6 is a sectional schematic view depicting a cross section of the multilayer-type coil component depicted in FIG. 1 along a line segment B1-B2.

As depicted in FIG. 5 and FIG. 6, the element body 10A has a plurality of insulating layers 15 laminated in a laminating direction. In the example depicted in FIG. 5 and FIG. 6, the laminating direction of the insulating layers 15 are parallel to the length direction L. That is, the laminating direction of the insulating layers 15 are parallel to the first principal surface 12*a* of the element body 10A as a mount surface.

Note that while boundaries between the insulating layers 15 are depicted in FIG. 5 and FIG. 6 for convenience in description, in fact, these boundaries do not clearly appear.

As depicted in FIG. 5 and FIG. 6, a first coil 31 and a second coil 32 are provided inside the element body 10A.

The first coil 31 includes a plurality of first coil conductors 41.

The second coil 32 includes a plurality of second coil conductors 42.

The first coil 31 and the second coil 32 are insulated from each other.

The first coil 31, more specifically, one end of the first coil 31, is electrically connected to the first outer electrode 21 via a first extended conductor 51 depicted in FIG. 5. In the example depicted in FIG. 5, the first extended conductor 51 is exposed to the first principal surface 12*a* of the element body 10A, and the first outer electrode 21 is connected to the exposed portion of the first extended conductor 51.

The first coil 31, more specifically, the other end of the first coil 31, is electrically connected to the second outer electrode 22 via a second extended conductor 52 depicted in FIG. 5. In the example depicted in FIG. 5, the second extended conductor 52 is exposed to the first principal surface 12*a* of the element body 10A, and the second outer electrode 22 is connected to the exposed portion of the second extended conductor 52.

The second coil 32, more specifically, one end of the second coil 32, is electrically connected to the third outer electrode 23 via a third extended conductor 53 depicted in FIG. 6. In the example depicted in FIG. 6, the third extended conductor 53 is exposed to the first principal surface 12*a* of the element body 10A, and the third outer electrode 23 is connected to the exposed portion of the third extended conductor 53.

The second coil 32, more specifically, the other end of the second coil 32, is electrically connected to the fourth outer electrode 24 via a fourth extended conductor 54 depicted in FIG. 6. In the example depicted in FIG. 6, the fourth extended conductor 54 is exposed to the first principal surface 12*a* of the element body 10A, and the fourth outer electrode 24 is connected to the exposed portion of the fourth extended conductor 54.

In the multilayer-type coil component of the present disclosure, the laminating direction, the direction of a coil axis of the first coil, and the direction of a coil axis of the second coil are parallel to the mount surface of the element body along the same direction.

As depicted in FIG. 5 and FIG. 6, the first coil 31 has a coil axis C1. In the example depicted in FIG. 5 and FIG. 6, the coil axis C1 of the first coil 31 penetrates between the first end face 11*a* and the second end face 11*b* of the element body 10A along the length direction L. That is, the direction of the coil axis C1 of the first coil 31 is parallel to the first principal surface 12*a* of the element body 10A as a mount surface.

As depicted in FIG. 5 and FIG. 6, the second coil 32 has a coil axis C2. In the example depicted in FIG. 5 and FIG. 6, the coil axis C2 of the second coil 32 penetrates between the first end face 11*a* and the second end face 11*b* of the element body 10A along the length direction L. That is, the direction of the coil axis C2 of the second coil 32 is parallel to the first principal surface 12*a* of the element body 10A as a mount surface.

Note that while the coil axis C1 of the first coil 31 and the coil axis C2 of the second coil 32 respectively pass through an inner circumferential side of the first coil 31 and an inner circumferential side of the second coil 32 when viewed from the length direction L, they are depicted in FIG. 5 and FIG. 6 for convenience in description.

Thus, the laminating direction of the insulating layers 15, the direction of the coil axis C1 of the first coil 31, and the direction of the coil axis C2 of the second coil 32 are along the same length direction L and parallel to the first principal surface 12*a* of the element body 10A as a mount surface.

In the multilayer-type coil component of the present disclosure, the first coil is formed with a plurality of first coil conductors laminated in the laminating direction being electrically connected, and each of the first coil conductors has the length smaller than one turn of the first coil; and the second coil is formed with a plurality of second coil conductors laminated in the laminating direction being electrically connected, and each of the second coil conductors has the length smaller than one turn of the second coil.

Figure 7:
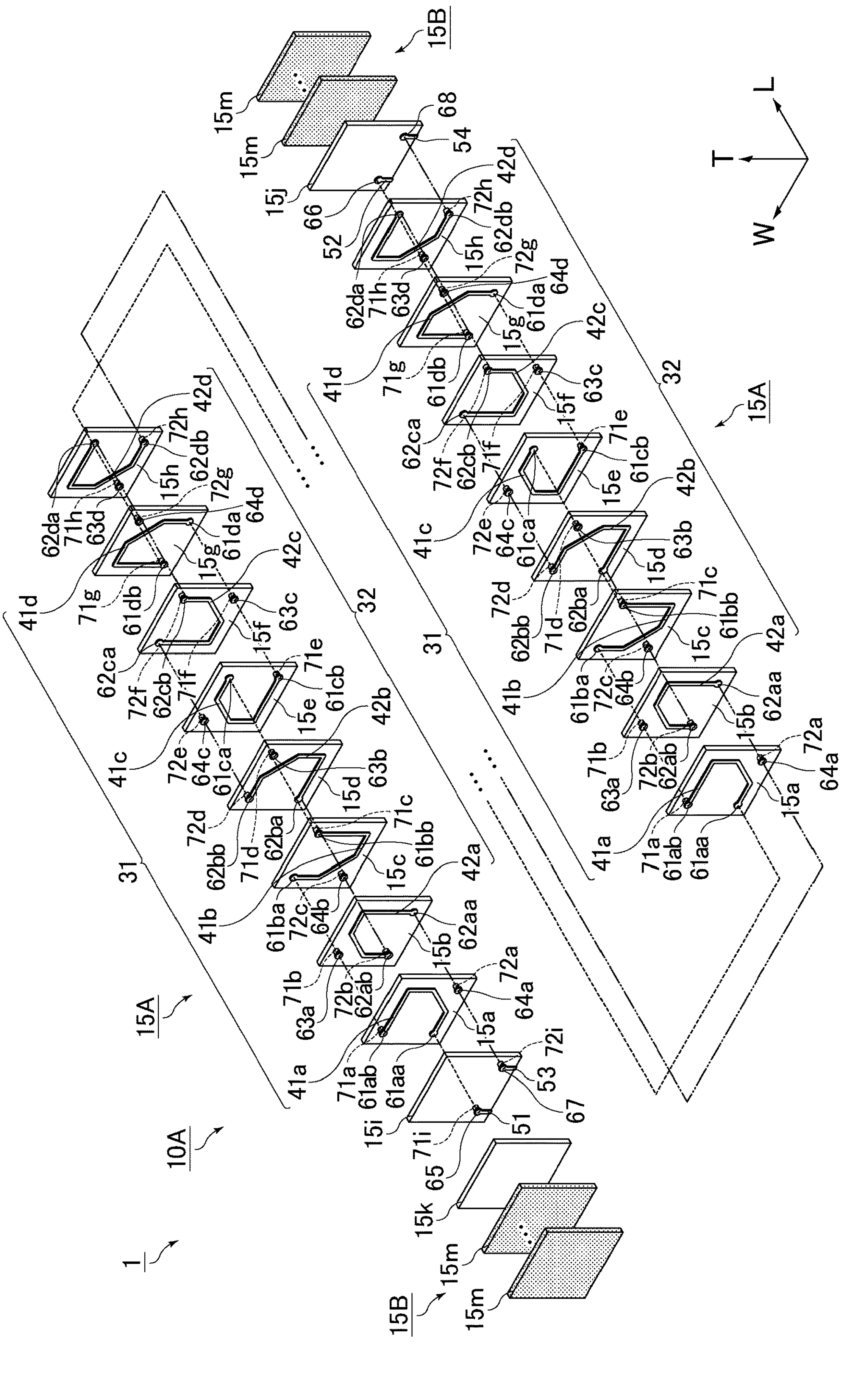
FIG. 7 is a perspective schematic view depicting one example of an element body and a coil depicted in FIG. 5 and FIG. 6 as being disassembled.
Figure 8:
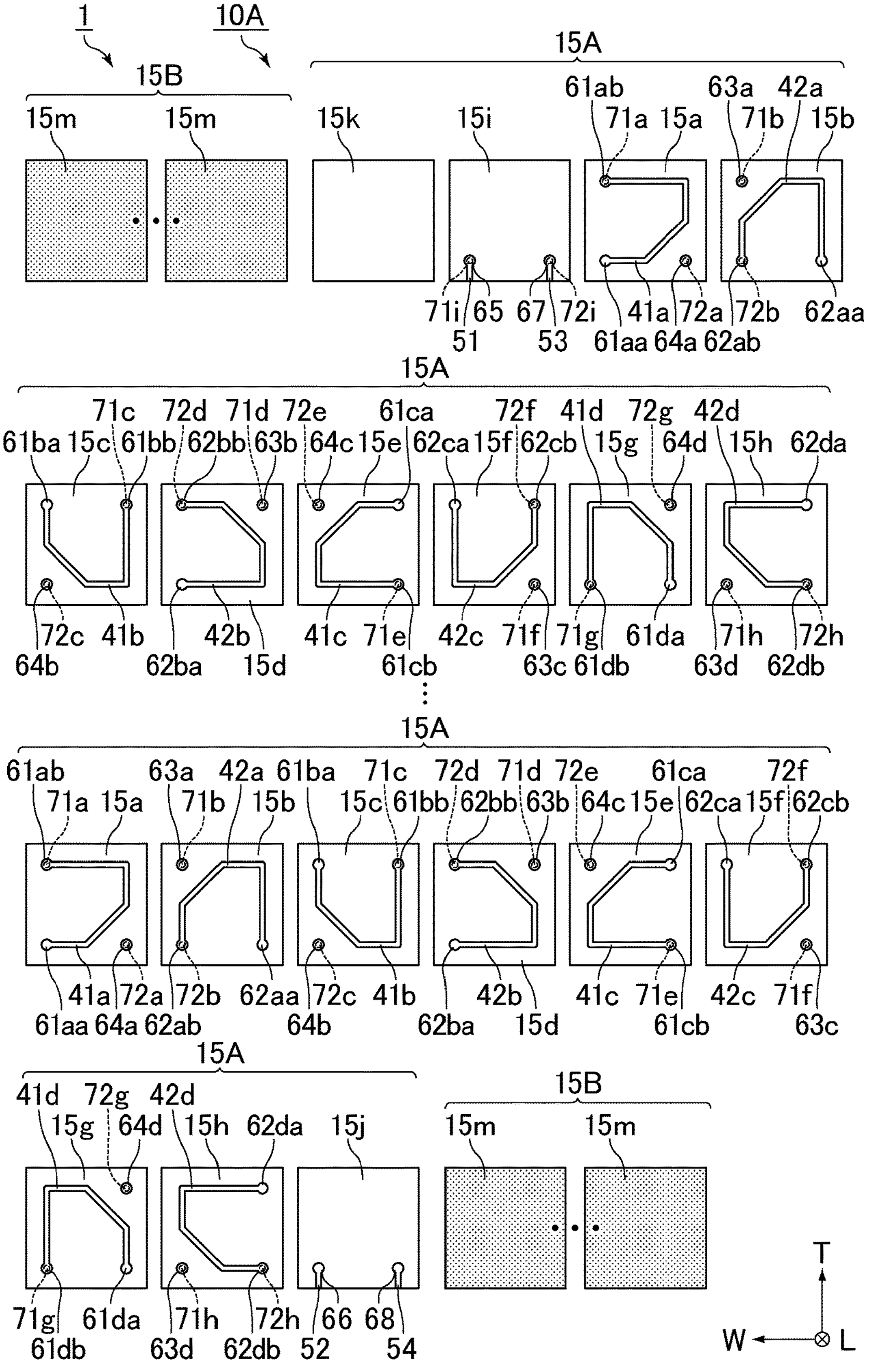
FIG. 8 is a plan schematic view depicting one example of the element body and the coil depicted in FIG. 5 and FIG. 6 as being disassembled.

FIG. 7 is a perspective schematic view depicting one example of an element body and a coil depicted in FIG. 5 and FIG. 6 as being disassembled. FIG. 8 is a plan schematic view depicting one example of the element body and the coil depicted in FIG. 5 and FIG. 6 as being disassembled.

The element body 10A depicted in FIG. 7 and FIG. 8 is formed by having an insulating layer 15*a*, an insulating layer 15*b*, an insulating layer 15*c*, an insulating layer 15*d*, an insulating layer 15*e*, an insulating layer 15*f*, an insulating layer 15*g*, an insulating layer 15*h*, an insulating layer 15*i*, an insulating layer 15*j*, an insulating layer 15*k*, and an insulating layer 15*m* as the insulating layers 15 depicted in FIG. 5 and FIG. 6 laminated in the laminating direction, here, the length direction L. More specifically, in the element body 10A, from a first end face 11*a* side to a second end face 11*b* side, the insulating layer 15*m*, the insulating layer 15*k*, the insulating layer 15*i*, the insulating layer 15*a*, the insulating layer 15*b*, the insulating layer 15*c*, the insulating layer 15*d*, the insulating layer 15*e*, the insulating layer 15*f*, the insulating layer 15*g*, the insulating layer 15*h*, . . . the insulating layer 15*a*, the insulating layer 15*b*, the insulating layer 15*c*, the insulating layer 15*d*, the insulating layer 15*e*, the insulating layer 15*f*, the insulating layer 15*g*, the insulating layer 15*h*, the insulating layer 15*j*, and the insulating layer 15*m* are sequentially laminated.

On the principal surface of the insulating layer 15*a*, a first coil conductor 41*a* is provided. The first coil conductor 41*a* has a land portion 61*aa* and a land portion 61*ab* at different end portions.

In the insulating layer 15*a*, a first coil via conductor 71*a* penetrating in the length direction L is provided at a position overlapping the land portion 61*ab* when viewed from the length direction L.

On the principal surface of the insulating layer 15*a*, a land portion 64*a* is provided at a position separate from the first coil conductor 41*a*.

In the insulating layer 15*a*, a second coil via conductor 72*a* penetrating in the length direction L is provided at a position overlapping the land portion 64*a* when viewed from the length direction L.

On the principal surface of the insulating layer 15*b*, a second coil conductor 42*a* is provided. The second coil conductor 42*a* has a land portion 62*aa* and a land portion 62*ab* at different end portions.

In the insulating layer 15*b*, a second coil via conductor 72*b* penetrating in the length direction L is provided at a position overlapping the land portion 62*ab* when viewed from the length direction L.

On the principal surface of the insulating layer 15*b*, a land portion 63*a* is provided at a position separate from the second coil conductor 42*a*.

In the insulating layer 15*b*, a first coil via conductor 71*b* penetrating in the length direction L is provided at a position overlapping the land portion 63*a* when viewed from the length direction L.

On the principal surface of the insulating layer 15*c*, a first coil conductor 41*b* is provided. The first coil conductor 41*b* has a land portion 61*ba* and a land portion 61*bb* at different end portions.

In the insulating layer 15*c*, a first coil via conductor 71*c* penetrating in the length direction L is provided at a position overlapping the land portion 61*bb* when viewed from the length direction L.

On the principal surface of the insulating layer 15*c*, a land portion 64*b* is provided at a position separate from the first coil conductor 41*b*.

In the insulating layer 15*c*, a second coil via conductor 72*c* penetrating in the length direction L is provided at a position overlapping the land portion 64*b* when viewed from the length direction L.

On the principal surface of the insulating layer 15*d*, a second coil conductor 42*b* is provided. The second coil conductor 42*b* has a land portion 62*ba* and a land portion 62*bb* at different end portions.

In the insulating layer 15*d*, a second coil via conductor 72*d* penetrating in the length direction L is provided at a position overlapping the land portion 62*bb* when viewed from the length direction L.

On the principal surface of the insulating layer 15*d*, a land portion 63*b* is provided at a position separate from the second coil conductor 42*b*.

In the insulating layer 15*d*, a first coil via conductor 71*d* penetrating in the length direction L is provided at a position overlapping the land portion 63*b* when viewed from the length direction L.

On the principal surface of the insulating layer 15*e*, a first coil conductor 41*c* is provided. The first coil conductor 41*c* has a land portion 61*ca* and a land portion 61*cb* at different end portions.

In the insulating layer 15*e*, a first coil via conductor 71*e* penetrating in the length direction L is provided at a position overlapping the land portion 61*cb* when viewed from the length direction L.

On the principal surface of the insulating layer 15*e*, a land portion 64*c* is provided at a position separate from the first coil conductor 41*c*.

In the insulating layer 15*e*, a second coil via conductor 72*e* penetrating in the length direction L is provided at a position overlapping the land portion 64*c* when viewed from the length direction L.

On the principal surface of the insulating layer 15*f*, a second coil conductor 42*c* is provided. The second coil conductor 42*c* has a land portion 62*ca* and a land portion 62*cb* at different end portions.

In the insulating layer 15*f*, a second coil via conductor 72*f* penetrating in the length direction L is provided at a position overlapping the land portion 62*cb* when viewed from the length direction L.

On the principal surface of the insulating layer 15*f*, a land portion 63*c* is provided at a position separate from the second coil conductor 42*c*.

In the insulating layer 15*f*, a first coil via conductor 71*f* penetrating in the length direction L is provided at a position overlapping the land portion 63*c* when viewed from the length direction L.

On the principal surface of the insulating layer 15*g*, a first coil conductor 41*d* is provided. The first coil conductor 41*d* has a land portion 61*da* and a land portion 61*db* at different end portions.

In the insulating layer 15*g*, a first coil via conductor 71*g* penetrating in the length direction L is provided at a position overlapping the land portion 61*db* when viewed from the length direction L.

On the principal surface of the insulating layer 15*g*, a land portion 64*d* is provided at a position separate from the first coil conductor 41*d*.

In the insulating layer 15*g*, a second coil via conductor 72*g* penetrating in the length direction L is provided at a position overlapping the land portion 64*d* when viewed from the length direction L.

On the principal surface of the insulating layer 15*h*, a second coil conductor 42*d* is provided. The second coil conductor 42*d* has a land portion 62*da* and a land portion 62*db* at different end portions.

In the insulating layer 15*h*, a second coil via conductor 72*h* penetrating in the length direction L is provided at a position overlapping the land portion 62*db* when viewed from the length direction L.

On the principal surface of the insulating layer 15*h*, a land portion 63*d* is provided at a position separate from the second coil conductor 42*d*.

In the insulating layer 15*h*, a first coil via conductor 71*h* penetrating in the length direction L is provided at a position overlapping the land portion 63*d* when viewed from the length direction L.

In the multilayer-type coil component 1, the insulating layer 15*a*, the insulating layer 15*b*, the insulating layer 15*c*, the insulating layer 15*d*, the insulating layer 15*e*, the insulating layer 15*f*, the insulating layer 15*g*, and the insulating layer 15*h* are repeatedly laminated sequentially in the laminating direction, here, the length direction L. Thus, the first coil conductor 41*a*, the first coil conductor 41*b*, the first coil conductor 41*c*, and the first coil conductor 41*d* are electrically connected as laminated in the length direction L together with these insulating layers and, as a result, the first coil 31 is configured. More specifically, description is made as follows.

First, the land portion 61*ab* of the first coil conductor 41*a* is electrically connected to the land portion 61*ba* of the first coil conductor 41*b* sequentially via the first coil via conductor 71*a*, the land portion 63*a*, and the first coil via conductor 71*b*. Next, the land portion 61*bb* of the first coil conductor 41*b* is electrically connected to the land portion 61*ca* of the first coil conductor 41*c* sequentially via the first coil via conductor 71*c*, the land portion 63*b*, and the first coil via conductor 71*d*. Next, the land portion 61*cb* of the first coil conductor 41*c* is electrically connected to the land portion 61*da* of the first coil conductor 41*d* sequentially via the first coil via conductor 71*e*, the land portion 63*c*, and the first coil via conductor 71*f*. Then, the land portion 61*db* of the first coil conductor 41*d* is electrically connected to the land portion 61*aa* of the first coil conductor 41*a* sequentially via the first coil via conductor 71*g*, the land portion 63*d*, and the first coil via conductor 71*h*.

As described above, the first coil conductor 41*a*, the first coil conductor 41*b*, the first coil conductor 41*c*, and the first coil conductor 41*d* are electrically connected sequentially and repeatedly, and thereby the first coil 31 is configured. That is, the first coil 31 is formed by having the first coil conductor 41*a*, the first coil conductor 41*b*, the first coil conductor 41*c*, and the first coil conductor 41*d* as the plurality of first coil conductors 41 depicted in FIG. 5 and FIG. 6 laminated in the laminating direction, here, the length direction L, and electrically connected.

In the multilayer-type coil component 1, the insulating layer 15*a*, the insulating layer 15*b*, the insulating layer 15*c*, the insulating layer 15*d*, the insulating layer 15*e*, the insulating layer 15*f*, the insulating layer 15*g*, and the insulating layer 15*h* are repeatedly laminated sequentially in the laminating direction, here, the length direction L. Thus, the second coil conductor 42*a*, the second coil conductor 42*b*, the second coil conductor 42*c*, and the second coil conductor 42*d* are electrically connected as laminated in the length direction L together with these insulating layers and, as a result, the second coil 32 is configured. More specifically, description is made as follows.

First, the land portion 62*ab* of the second coil conductor 42*a* is electrically connected to the land portion 62*ba* of the second coil conductor 42*b* sequentially via the second coil via conductor 72*b*, the land portion 64*b*, and the second coil via conductor 72*c*. Next, the land portion 62*bb* of the second coil conductor 42*b* is electrically connected to the land portion 62*ca* of the second coil conductor 42*c* sequentially via the second coil via conductor 72*d*, the land portion 64*c*, and the second coil via conductor 72*e*. Next, the land portion 62*cb* of the second coil conductor 42*c* is electrically connected to the land portion 62*da* of the second coil conductor 42*d* sequentially via the second coil via conductor 72*f*, the land portion 64*d*, and the second coil via conductor 72*g*. Then, the land portion 62*db* of the second coil conductor 42*d* is electrically connected to the land portion 62*aa* of the second coil conductor 42*a* sequentially via the second coil via conductor 72*h*, the land portion 64*a*, and the second coil via conductor 72*a*.

As described above, the second coil conductor 42*a*, the second coil conductor 42*b*, the second coil conductor 42*c*, and the second coil conductor 42*d* are electrically connected sequentially and repeatedly, and thereby the second coil 32 is configured. That is, the second coil 32 is formed by having the second coil conductor 42*a*, the second coil conductor 42*b*, the second coil conductor 42*c*, and the second coil conductor 42*d* as the plurality of second coil conductors 42 depicted in FIG. 5 and FIG. 6 laminated in the laminating direction, here, the length direction L, and electrically connected. The second coil 32 configured as described above is insulated from the first coil 31.

In the multilayer-type coil component 1, the first coil conductor and the second coil conductor may be alternately laminated in the laminating direction, here, the length direction L, and do not have to be alternately laminated. In the example depicted in FIG. 7 and FIG. 8, the first coil conductor and the second coil conductor are alternately laminated in the length direction L.

As depicted in FIG. 7 and FIG. 8, in the element body 10A, with respect to the laminating portion of the insulating layer 15*a*, the insulating layer 15*b*, the insulating layer 15*c*, the insulating layer 15*d*, the insulating layer 15*e*, the insulating layer 15*f*, the insulating layer 15*g*, and the insulating layer 15*h*, the insulating layer 15*i* is laminated on the first end face 11*a* side, and the insulating layer 15*j* is laminated on the second end face 11*b* side.

On the principal surface of the insulating layer 15*i*, the first extended conductor 51 is provided. The first extended conductor 51 has a land portion 65 on one end, and is exposed to an outer edge of the insulating layer 15*i* at the other end.

In the insulating layer 15*i*, a first coil via conductor 71*i* penetrating in the length direction L is provided at a position overlapping the land portion 65 when viewed from the length direction L.

On the principal surface of the insulating layer 15*i*, the third extended conductor 53 is provided at a position separate from the first extended conductor 51. The third extended conductor 53 has a land portion 67 at one end, and is exposed to an outer edge of the insulating layer 15*i* at the other end.

In the insulating layer 15*i*, a second coil via conductor 72*i* penetrating in the length direction L is provided at a position overlapping the land portion 67 when viewed from the length direction L.

On the principal surface of the insulating layer 15*j*, the second extended conductor 52 is provided. The second extended conductor 52 has a land portion 66 on one end, and is exposed to an outer edge of the insulating layer 15*j* at the other end.

On the principal surface of the insulating layer 15*j*, the fourth extended conductor 54 is provided at a position separate from the second extended conductor 52. The fourth extended conductor 54 has a land portion 68 at one end, and is exposed to an outer edge of the insulating layer 15*j* at the other end.

In the multilayer-type coil component 1, with respect to the laminating portion of the insulating layer 15*a*, the insulating layer 15*b*, the insulating layer 15*c*, the insulating layer 15*d*, the insulating layer 15*e*, the insulating layer 15*f*, the insulating layer 15*g*, and the insulating layer 15*h*, the insulating layer 15*i* is laminated on the first end face 11*a* side of the element body 10A, and the insulating layer 15*j* is laminated on the second end face 11*b* side. Thus, one end of the first coil 31 is electrically connected to the first extended conductor 51, and the other end of the first coil 31 is electrically connected to the second extended conductor 52. More specifically, description is made as follows.

The land portion 61*aa* of the first coil conductor 41*a* positioned at one end of the first coil 31 is electrically connected to the land portion 65 of the first extended conductor 51 via the first coil via conductor 71*i*. Also, the land portion 61*db* of the first coil conductor 41*d* positioned at the other end of the first coil 31 is electrically connected to the land portion 66 of the second extended conductor 52 sequentially via the first coil via conductor 71*g*, the land portion 63*d*, and the first coil via conductor 71*h*.

In the manner described above, the land portion 61*aa* of the first coil conductor 41*a* positioned at one end of the first coil 31 is electrically connected to the first outer electrode 21 depicted in FIG. 5 via the first extended conductor 51. Also, the land portion 61*db* of the first coil conductor 41*d* positioned at the other end of the first coil 31 is electrically connected to the second outer electrode 22 depicted in FIG. 5 via the second extended conductor 52.

In the multilayer-type coil component 1, with respect to the laminating portion of the insulating layer 15*a*, the insulating layer 15*b*, the insulating layer 15*c*, the insulating layer 15*d*, the insulating layer 15*e*, the insulating layer 15*f*, the insulating layer 15*g*, and the insulating layer 15*h*, the insulating layer 15*i* is laminated on the first end face 11*a* side of the element body 10A, and the insulating layer 15*j* is laminated on the second end face 11*b* side. Thus, one end of the second coil 32 is electrically connected to the third extended conductor 53, and the other end of the second coil 32 is electrically connected to the fourth extended conductor 54. More specifically, description is made as follows.

The land portion 62*aa* of the second coil conductor 42*a* positioned at one end of the second coil 32 is electrically connected to the land portion 67 of the third extended conductor 53 sequentially via the second coil via conductor 72*a*, the land portion 64*a*, and the second coil via conductor 72*i*. Also, the land portion 62*db* of the second coil conductor 42*d* positioned at the other end of the second coil 32 is electrically connected to the land portion 68 of the fourth extended conductor 54 via the second coil via conductor 72*h*.

In the manner described above, the land portion 62*aa* of the second coil conductor 42*a* positioned at one end of the second coil 32 is electrically connected to the third outer electrode 23 depicted in FIG. 6 via the third extended conductor 53. Also, the land portion 62*db* of the second coil conductor 42*d* positioned at the other end of the second coil 32 is electrically connected to the fourth outer electrode 24 depicted in FIG. 6 via the fourth extended conductor 54.

When viewed from the laminating direction, here, the length direction L, each of the first coil conductor and the second coil conductor may have a shape configured of a plurality of straight-line portions as depicted in FIG. 7 and FIG. 8, may have a shape configured of a straight-line portion and a curved portion, or may have a circular portion. That is, when viewed from the length direction L, each of the first coil 31 and the second coil 32 may have a shape configured of a plurality of straight-line portions as depicted in FIG. 7 and FIG. 8, may have a shape configured of a straight-line portion and a curved portion, or may have a circular shape.

When viewed from the laminating direction, here, the length direction L, each land portion may have a circular shape as depicted in FIG. 7 and FIG. 8 or may have a polygonal shape.

Each coil conductor and each extended conductor does not have to independently have a land portion at an end portion.

The constituent material of each coil conductor, each extended conductor, and each via conductor can be, for example, Ag, Au, Cu, Pd, Ni, Al, an alloy containing at least one of these metals, or the like.

The element body 10A may have at least one insulating layer not provided with a conductor such as a coil conductor, an extended conductor, or a via conductor at at least one of the first end face 11*a* side and the second end face 11*b* side. More specifically, in the element body 10A, at least one insulating layer not provided with a conductor such as a coil conductor, an extended conductor, or a via conductor may be laminated on at least one of the first end face 11*a* side of the insulating layer 15*i* and the second end face 11*b* side of the insulating layer 15*j*. In the example depicted in FIG. 7 and FIG. 8, the insulating layer 15*k* and the insulating layer 15*m* not provided with a conductor such as a coil conductor, an extended conductor, or a via conductor is laminated on the first end face 11*a* side of the insulating layer 15*i*, and the insulating layer 15*m* not provided with a conductor such as a coil conductor, an extended conductor, or a via conductor is laminated on the second end face 11*b* side of the insulating layer 15*j*.

The number of laminations of the insulating layers 15*k* and the insulating layers 15*m* may be one or more.

The length of each of the first coil conductor 41*a*, the first coil conductor 41*b*, the first coil conductor 41*c*, and the first coil conductor 41*d* is smaller than one turn of the first coil 31.

The length of each of the first coil conductor 41*a*, the first coil conductor 41*b*, the first coil conductor 41*c*, and the first coil conductor 41*d* may be equal to one another, may be different from one another, or may be partially different as long as the length is smaller than one turn of the first coil 31.

The length of each of the second coil conductor 42*a*, the second coil conductor 42*b*, the second coil conductor 42*c*, and the second coil conductor 42*d* is smaller than one turn of the second coil 32.

The length of each of the second coil conductor 42*a*, the second coil conductor 42*b*, the second coil conductor 42*c*, and the second coil conductor 42*d* may be equal to one another, may be different from one another, or may be partially different as long as the length is smaller than one turn of the second coil 32.

The length of each of the first coil conductor 41*a*, the first coil conductor 41*b*, the first coil conductor 41*c*, the first coil conductor 41*d*, the second coil conductor 42*a*, the second coil conductor 42*b*, the second coil conductor 42*c*, and the second coil conductor 42*d* may be equal to one another, may be different from one another, or may be partially different.

The length of a coil conductor refers to a length in the direction in which the coil conductor extends on a plane orthogonal to the laminating direction when viewed from the laminating direction.

As described above, in the multilayer-type coil component 1, the length of each first coil conductor is smaller than one turn of the first coil 31, and the length of each second coil conductor is smaller than one turn of the second coil 32. Thus, compared with the case in which the coil conductor is in a spiral shape as in the common mode noise filter described in Japanese Unexamined Patent Application Publication No. 2014-27072, when viewed from the laminating direction, here, the length direction L, the area where first coil conductors adjacent to each other in the length direction L overlap and the area where second coil conductors adjacent to each other in the length direction L overlap are reduced and, in turn, the area where the first coil 31 and the second coil 32 overlap is reduced. Thus, in the multilayer-type coil component 1, compared with the conventional structure as that of the common mode noise filter described in Japanese Unexamined Patent Application Publication No. 2014-27072, stray capacitance decreases. Thus, while signal components in differential mode are not attenuated but transmitted, noise components in common mode tend to be attenuated in a wide frequency domain, in particular, a high frequency domain. That is, according to the multilayer-type coil component 1, a multilayer-type coil component that is excellent in high frequency characteristics is achieved.

In the multilayer-type coil component 1, in view of reducing, when viewed from the laminating direction, here, the length direction L, the area where first coil conductors adjacent to each other in the length direction L overlap and the area where second coil conductors adjacent to each other in the length direction L overlap, and the area where the first coil 31 and the second coil 32 overlap, a preferable structure is described below. According to the preferable structure of the multilayer-type coil component 1 described below, stray capacitance tends to be small and, as a result, high frequency characteristics are easily improved.

In the multilayer-type coil component of the present disclosure, when viewed from the laminating direction, at least one set of first coil conductors adjacent to each other in the laminating direction preferably takes a shape in a relation of rotational symmetry.

In the multilayer-type coil component 1, when viewed from the laminating direction, here, the length direction L, at least one set of first coil conductors adjacent to each other in the length direction L preferably takes a shape in a relation of rotational symmetry. In the example depicted in FIG. 7 and FIG. 8, every set of first coil conductors adjacent to each other in the length direction L takes a shape in a relation of rotational symmetry with respect to the center of the insulating layer. More specifically, for each of a set of the first coil conductor 41*a* and the first coil conductor 41*b*, a set of the first coil conductor 41*b* and the first coil conductor 41*c*, a set of the first coil conductor 41*c* and the first coil conductor 41*d*, and a set of the first coil conductor 41*d* and the first coil conductor 41*a*, the first coil conductors take a shape in a relation of rotational symmetry with respect to the center of the insulating layer.

Note that among the set of the first coil conductor 41*a* and the first coil conductor 41*b*, the set of the first coil conductor 41*b* and the first coil conductor 41*c*, the set of the first coil conductor 41*c* and the first coil conductor 41*d*, and the set of the first coil conductor 41*d* and the first coil conductor 41*a*, for part of the sets, the first coil conductors may take a shape in a relation of rotational symmetry with respect to the center of the insulating layer.

In the specification, "two coil conductors take a shape in a relation of rotational symmetry when viewed from the laminating direction" means that, in a state in which one coil conductor is rotated at a predetermined rotational angle to match the geometrical center when viewed from the laminating direction, the one coil conductor and the other coil conductor have a relation of overlapping 90% or more on an area basis with reference to the area of the coil conductor with a smaller area.

When viewed from the laminating direction, whether two coil conductors adjacent to each other in the laminating direction take a shape in a relation of rotational symmetry is checked as follows, for example. First, while the multilayer-type coil component is polished, a section of the multilayer-type coil component orthogonal to the laminating direction is sequentially observed along the laminating direction, and an image of two coil conductors adjacent to each other in the laminating direction is taken by a scanning electron microscope (SEM). Then, in the taken image of the two coil conductors, in a state in which one coil conductor is rotated by using image analysis software, a degree with which the one coil conductor and the other coil conductor overlap on an area basis is checked.

In the multilayer-type coil component of the present disclosure, when viewed from the laminating direction, at least one set of first coil conductors adjacent to each other in the laminating direction may take a shape in a relation of 90-degree rotational symmetry.

In the example depicted in FIG. 7 and FIG. 8, every set of first coil conductors adjacent to each other in the length direction L takes a shape in a relation of 90-degree rotational symmetry with respect to the center of the insulating layer.

More specifically, for each of the set of the first coil conductor 41*a* and the first coil conductor 41*b*, the set of the first coil conductor 41*b* and the first coil conductor 41*c*, the set of the first coil conductor 41*c* and the first coil conductor 41*d*, and the set of the first coil conductor 41*d* and the first coil conductor 41*a*, the first coil conductors take a shape in a relation of 90-degree rotational symmetry, in other words, a relation of four-fold symmetry with a rotational angle of 90°, with respect to the center of the insulating layer.

Note that among the set of the first coil conductor 41*a* and the first coil conductor 41*b*, the set of the first coil conductor 41*b* and the first coil conductor 41*c*, the set of the first coil conductor 41*c* and the first coil conductor 41*d*, and the set of the first coil conductor 41*d* and the first coil conductor 41*a*, for part of the sets, the first coil conductors may take a shape in a relation of 90-degree rotational symmetry with respect to the center of the insulating layer.

Note that when viewed from the laminating direction, at least one set of first coil conductors adjacent to each other in the laminating direction may take a shape in a relation of rotation symmetry with a rotational angle other than 90 degrees.

In the multilayer-type coil component of the present disclosure, when viewed from the laminating direction, at least one set of second coil conductors adjacent to each other in the laminating direction preferably takes a shape in a relation of rotational symmetry.

In the multilayer-type coil component 1, when viewed from the laminating direction, here, the length direction L, at least one set of second coil conductors adjacent to each other in the length direction L preferably takes a shape in a relation of rotational symmetry. In the example depicted in FIG. 7 and FIG. 8, every set of second coil conductors adjacent to each other in the length direction L takes a shape in a relation of rotational symmetry with respect to the center of the insulating layer. More specifically, for each of a set of the second coil conductor 42*a* and the second coil conductor 42*b*, a set of the second coil conductor 42*b* and the second coil conductor 42*c*, a set of the second coil conductor 42*c* and the second coil conductor 42*d*, and a set of the second coil conductor 42*d* and the second coil conductor 42*a*, the second coil conductors take a shape in a relation of rotational symmetry with respect to the center of the insulating layer.

Note that among the set of the second coil conductor 42*a* and the second coil conductor 42*b*, the set of the second coil conductor 42*b* and the second coil conductor 42*c*, the set of the second coil conductor 42*c* and the second coil conductor 42*d*, and the set of the second coil conductor 42*d* and the second coil conductor 42*a*, for part of the sets, the second coil conductors may take a shape in a relation of rotational symmetry with respect to the center of the insulating layer.

In the multilayer-type coil component of the present disclosure, when viewed from the laminating direction, at least one set of second coil conductors adjacent to each other in the laminating direction may take a shape in a relation of 90-degree rotational symmetry.

In the example depicted in FIG. 7 and FIG. 8, every set of second coil conductors adjacent to each other in the length direction L takes a shape in a relation of 90-degree rotational symmetry with respect to the center of the insulating layer. More specifically, for each of the set of the second coil conductor 42*a* and the second coil conductor 42*b*, the set of the second coil conductor 42*b* and the second coil conductor 42*c*, the set of the second coil conductor 42*c* and the second coil conductor 42*d*, and the set of the second coil conductor 42*d* and the second coil conductor 42*a*, the second coil conductors take a shape in a relation of 90-degree rotational symmetry, in other words, a relation of four-fold symmetry with a rotational angle of 90°, with respect to the center of the insulating layer.

Note that among the set of the second coil conductor 42*a* and the second coil conductor 42*b*, the set of the second coil conductor 42*b* and the second coil conductor 42*c*, the set of the second coil conductor 42*c* and the second coil conductor 42*d*, and the set of the second coil conductor 42*d* and the second coil conductor 42*a*, for part of the sets, the second coil conductors may take a shape in a relation of 90-degree rotational symmetry with respect to the center of the insulating layer.

Note that when viewed from the laminating direction, at least one set of second coil conductors adjacent to each other in the laminating direction may take a shape in a relation of rotation symmetry with a rotational angle other than 90 degrees.

In the multilayer-type coil component of the present disclosure, when viewed from the laminating direction, the first coil conductor preferably does not overlap one end of the second coil conductor adjacent to the first coil conductor in the laminating direction.

In the multilayer-type coil component 1, when viewed from the laminating direction, here, the length direction L, the first coil conductor preferably does not overlap one end of the second coil conductor adjacent to the first coil conductor in the laminating direction.

In the example depicted in FIG. 7 and FIG. 8, when viewed from the length direction L, the first coil conductor 41*a* does not overlap the land portion 62*aa* positioned at the end portion of the second coil conductor 42*a* adjacent to the first coil conductor 41*a* in the length direction L and does not overlap the land portion 62*db* positioned at the end portion of the second coil conductor 42*d* adjacent to the first coil conductor 41*a* in the length direction L.

In the example depicted in FIG. 7 and FIG. 8, when viewed from the length direction L, the first coil conductor 41*b* does not overlap the land portion 62*ab* positioned at the end portion of the second coil conductor 42*a* adjacent to the first coil conductor 41*b* in the length direction L and does not overlap the land portion 62*ba* positioned at the end portion of the second coil conductor 42*b* adjacent to the first coil conductor 41*b* in the length direction L.

In the example depicted in FIG. 7 and FIG. 8, when viewed from the length direction L, the first coil conductor 41*c* does not overlap the land portion 62*bb* positioned at the end portion of the second coil conductor 42*b* adjacent to the first coil conductor 41*c* in the length direction L and does not overlap the land portion 62*ca* positioned at the end portion of the second coil conductor 42*c* adjacent to the first coil conductor 41*c* in the length direction L.

In the example depicted in FIG. 7 and FIG. 8, when viewed from the length direction L, the first coil conductor 41*d* does not overlap the land portion 62*cb* positioned at the end portion of the second coil conductor 42*c* adjacent to the first coil conductor 41*d* in the length direction L and does not overlap the land portion 62*da* positioned at the end portion of the second coil conductor 42*d* adjacent to the first coil conductor 41*d* in the length direction L.

In the multilayer-type coil component of the present disclosure, in the laminating direction, two second coil conductors adjacent to one first coil conductor and provided so as to interpose the one first coil conductor are preferably electrically connected to each other via a second coil via conductor provided so as to penetrate through the insulating layer in the laminating direction. When viewed from the laminating direction, the second coil via conductor preferably overlaps one end of each of the two second coil conductors on an outer circumferential side of the one first coil conductor.

In the multilayer-type coil component 1, in the laminating direction, here, the length direction L, two second coil conductors adjacent to one first coil conductor and provided so as to interpose the one first coil conductor are preferably electrically connected to each other via a second coil via conductor provided so as to penetrate through the insulating layer in the laminating direction, here, the length direction L.

In the multilayer-type coil component 1, when viewed from the laminating direction, here, the length direction L, the second coil via conductor preferably overlaps one end of each of the two second coil conductors on an outer circumferential side of the one first coil conductor.

In the specification, the outer circumferential side of the coil conductor means an outer side portion of the coil conductor opposite to the inner circumference with respect to the outer circumference of the coil conductor.

In the example depicted in FIG. 7 and FIG. 8, in the length direction L, the second coil conductor 42*d* and the second coil conductor 42*a* adjacent to the first coil conductor 41*a* and provided so as to interpose the first coil conductor 41*a* are electrically connected to each other via the second coil via conductor 72*h* penetrating through the insulating layer 15*h* in the length direction L and the second coil via conductor 72*a* penetrating through the insulating layer 15*a* in the length direction L. Furthermore, when viewed from the length direction L, the second coil via conductor 72*h* and the second coil via conductor 72*a* overlap both of the land portion 62*db* positioned at the end portion of the second coil conductor 42*d* and the land portion 62*aa* positioned at the end portion of the second coil conductor 42*a* on the outer circumferential side of the first coil conductor 41*a*.

In the example depicted in FIG. 7 and FIG. 8, in the length direction L, the second coil conductor 42*a* and the second coil conductor 42*b* adjacent to the first coil conductor 41*b* and provided so as to interpose the first coil conductor 41*b* are electrically connected to each other via the second coil via conductor 72*b* penetrating through the insulating layer 15*b* in the length direction L and the second coil via conductor 72*c* penetrating through the insulating layer 15*c* in the length direction L. Furthermore, when viewed from the length direction L, the second coil via conductor 72*b* and the second coil via conductor 72*c* overlap both of the land portion 62*ab* positioned at the end portion of the second coil conductor 42*a* and the land portion 62*ba* positioned at the end portion of the second coil conductor 42*b* on the outer circumferential side of the first coil conductor 41*b*.

In the example depicted in FIG. 7 and FIG. 8, in the length direction L, the second coil conductor 42*b* and the second coil conductor 42*c* adjacent to the first coil conductor 41*c* and provided so as to interpose the first coil conductor 41*c* are electrically connected to each other via the second coil via conductor 72*d* penetrating through the insulating layer 15*d* in the length direction L and the second coil via conductor 72*e* penetrating through the insulating layer 15*e* in the length direction L. Furthermore, when viewed from the length direction L, the second coil via conductor 72*d* and the second coil via conductor 72*e* overlap both of the land portion 62*bb* positioned at the end portion of the second coil conductor 42*b* and the land portion 62*ca* positioned at the end portion of the second coil conductor 42*c* on the outer circumferential side of the first coil conductor 41*c*.

In the example depicted in FIG. 7 and FIG. 8, in the length direction L, the second coil conductor 42*c* and the second coil conductor 42*d* adjacent to the first coil conductor 41*d* and provided so as to interpose the first coil conductor 41*d* are electrically connected to each other via the second coil via conductor 72*f* penetrating through the insulating layer 15*f* in the length direction L and the second coil via conductor 72*g* penetrating through the insulating layer 15*g* in the length direction L. Furthermore, when viewed from the length direction L, the second coil via conductor 72*f* and the second coil via conductor 72*g* overlap both of the land portion 62*cb* positioned at the end portion of the second coil conductor 42*c* and the land portion 62*da* positioned at the end portion of the second coil conductor 42*d* on the outer circumferential side of the first coil conductor 41*d*.

In the multilayer-type coil component of the present disclosure, when viewed from the laminating direction, the second coil conductor preferably does not overlap one end of the first coil conductor adjacent to the second coil conductor in the laminating direction.

In the multilayer-type coil component 1, when viewed from the laminating direction, here, the length direction L, the second coil conductor preferably does not overlap one end of the first coil conductor adjacent to the second coil conductor in the laminating direction.

In the example depicted in FIG. 7 and FIG. 8, when viewed from the length direction L, the second coil conductor 42*a* does not overlap the land portion 61*ab* positioned at the end portion of the first coil conductor 41*a* adjacent to the second coil conductor 42*a* in the length direction L, and does not overlap the land portion 61*ba* positioned at the end portion of the first coil conductor 41*b* adjacent to the second coil conductor 42*a* in the length direction L.

In the example depicted in FIG. 7 and FIG. 8, when viewed from the length direction L, the second coil conductor 42*b* does not overlap the land portion 61*bb* positioned at the end portion of the first coil conductor 41*b* adjacent to the second coil conductor 42*b* in the length direction L, and does not overlap the land portion 61*ca* positioned at the end portion of the first coil conductor 41*c* adjacent to the second coil conductor 42*b* in the length direction L.

In the example depicted in FIG. 7 and FIG. 8, when viewed from the length direction L, the second coil conductor 42*c* does not overlap the land portion 61*cb* positioned at the end portion of the first coil conductor 41*c* adjacent to the second coil conductor 42*c* in the length direction L, and does not overlap the land portion 61*da* positioned at the end portion of the first coil conductor 41*d* adjacent to the second coil conductor 42*c* in the length direction L.

In the example depicted in FIG. 7 and FIG. 8, when viewed from the length direction L, the second coil conductor 42*d* does not overlap the land portion 61*db* positioned at the end portion of the first coil conductor 41*d* adjacent to the second coil conductor 42*d* in the length direction L, and does not overlap the land portion 61*aa* positioned at the end portion of the first coil conductor 41*a* adjacent to the second coil conductor 42*d* in the length direction L.

In the multilayer-type coil component of the present disclosure, in the laminating direction, two first coil conductors adjacent to one second coil conductor and provided so as to interpose the one second coil conductor are preferably electrically connected to each other via a first coil via conductor provided so as to penetrate through the insulating layer in the laminating direction. When viewed from the laminating direction, the first coil via conductor preferably overlaps one end of each of the two first coil conductors on an outer circumferential side of the one second coil conductor.

In the multilayer-type coil component 1, in the laminating direction, here, the length direction L, two first coil conductors adjacent to one second coil conductor and provided so as to interpose the one second coil conductor are preferably electrically connected to each other via a first coil via conductor provided so as to penetrate through the insulating layer in the laminating direction, here, the length direction L.

In the multilayer-type coil component 1, when viewed from the laminating direction, here, the length direction L, the first coil via conductor preferably overlaps one end of each of the two first coil conductors on an outer circumferential side of the one second coil conductor.

In the example depicted in FIG. 7 and FIG. 8, in the length direction L, the first coil conductor 41*a* and the first coil conductor 41*b* adjacent to the second coil conductor 42*a* and provided so as to interpose the second coil conductor 42*a* are electrically connected to each other via the first coil via conductor 71*a* penetrating through the insulating layer 15*a* in the length direction L and the first coil via conductor 71*b* penetrating through the insulating layer 15*b* in the length direction L. Furthermore, when viewed from the length direction L, the first coil via conductor 71*a* and the first coil via conductor 71*b* overlap both of the land portion 61*ab* positioned at the end portion of the first coil conductor 41*a* and the land portion 61*ba* positioned at the end portion of the first coil conductor 41*b* on the outer circumferential side of the second coil conductor 42*a*.

In the example depicted in FIG. 7 and FIG. 8, in the length direction L, the first coil conductor 41*b* and the first coil conductor 41*c* adjacent to the second coil conductor 42*b* and provided so as to interpose the second coil conductor 42*b* are electrically connected to each other via the first coil via conductor 71*c* penetrating through the insulating layer 15*c* in the length direction L and the first coil via conductor 71*d* penetrating through the insulating layer 15*d* in the length direction L. Furthermore, when viewed from the length direction L, the first coil via conductor 71*c* and the first coil via conductor 71*d* overlap both of the land portion 61*bb* positioned at the end portion of the first coil conductor 41*b* and the land portion 61*ca* positioned at the end portion of the first coil conductor 41*c* on the outer circumferential side of the second coil conductor 42*b*.

In the example depicted in FIG. 7 and FIG. 8, in the length direction L, the first coil conductor 41*c* and the first coil conductor 41*d* adjacent to the second coil conductor 42*c* and provided so as to interpose the second coil conductor 42*c* are electrically connected to each other via the first coil via conductor 71*e* penetrating through the insulating layer 15*e* in the length direction L and the first coil via conductor 71*f* penetrating through the insulating layer 15*f* in the length direction L. Furthermore, when viewed from the length direction L, the first coil via conductor 71*e* and the first coil via conductor 71*f* overlap both of the land portion 61*cb* positioned at the end portion of the first coil conductor 41*c* and the land portion 61*da* positioned at the end portion of the first coil conductor 41*d* on the outer circumferential side of the second coil conductor 42*c*.

In the example depicted in FIG. 7 and FIG. 8, in the length direction L, the first coil conductor 41*d* and the first coil conductor 41*a* adjacent to the second coil conductor 42*d* and provided so as to interpose the second coil conductor 42*d* are electrically connected to each other via the first coil via conductor 71*g* penetrating through the insulating layer 15*g* in the length direction L and the first coil via conductor 71*h* penetrating through the insulating layer 15*h* in the length direction L. Furthermore, when viewed from the length direction L, the first coil via conductor 71*g* and the first coil via conductor 71*h* overlap both of the land portion 61*db* positioned at the end portion of the first coil conductor 41*d* and the land portion 61*aa* positioned at the end portion of the first coil conductor 41*a* on the outer circumferential side of the second coil conductor 42*d*.

In the multilayer-type coil component of the present disclosure, when viewed from the laminating direction, the first coil conductor and the second coil conductor preferably take a shape in a relation of non-rotational symmetry.

In the multilayer-type coil component 1, when viewed from the laminating direction, here, the length direction L, the first coil conductor and the second coil conductor preferably take a shape in a relation of non-rotational symmetry. In the example depicted in FIG. 7 and FIG. 8, the first coil conductor indicated as the first coil conductor 41*a*, the first coil conductor 41*b*, the first coil conductor 41*c*, and the first coil conductor 41*d* and the second coil conductor indicated as the second coil conductor 42*a*, the second coil conductor 42*b*, the second coil conductor 42*c*, and the second coil conductor 42*d* take a shape in a relation of non-rotational symmetry with respect to the center of the insulating layer.

In the specification, "two coil conductors take a shape in a relation of non-rotational symmetry when viewed from the laminating direction" corresponds to a mode other than the above-described mode in which they take a shape in a relation of rotational symmetry.

In the multilayer-type coil component of the present disclosure, as insulating layers, the element body preferably has a non-magnetic layer and magnetic layers provided so as to interpose the non-magnetic layer in the laminating direction, and the first coil and the second coil are preferably provided inside the non-magnetic layer.

As depicted in FIG. 5 and FIG. 6, the element body 10A preferably has a non-magnetic layer 15A and magnetic layers 15B as the insulating layers 15.

As depicted in FIG. 5 and FIG. 6, the magnetic layers 15B are preferably provided so as to interpose the non-magnetic layer 15A in the laminating direction, here, the length direction L.

As depicted in FIG. 5 and FIG. 6, the first coil 31 and the second coil 32 are preferably provided inside the non-magnetic layers 15A. In this case, the high frequency characteristics of the multilayer-type coil component 1 are easily improved.

In the example depicted in FIG. 7 and FIG. 8, the insulating layer 15*a*, the insulating layer 15*b*, the insulating layer 15*c*, the insulating layer 15*d*, the insulating layer 15*e*, the insulating layer 15*f*, the insulating layer 15*g*, the insulating layer 15*h*, the insulating layer 15*i*, the insulating layer 15*j*, and the insulating layer 15*k* configure the non-magnetic layer 15A.

In the example depicted in FIG. 7 and FIG. 8, the insulating layer 15*m* configures each magnetic layer 15B.

In the multilayer-type coil component of the present disclosure, the non-magnetic layer may be configured of a dielectric glass material which contains a glass material containing K, B, and Si and a filler containing quartz.

In the multilayer-type coil component 1, the non-magnetic layer 15A may be configured of a dielectric glass material (also called a glass ceramic material) which contains a glass material containing K, B, and Si and a filler containing quartz ($SiO_2$).

The glass material preferably contains 0.5 weight % or more and 5 weight % or less (i.e., from 0.5 weight % to 5 weight %) of K on $K_2O$ basis, 10 weight % or more and 25 weight % or less (i.e., from 10 weight % to 25 weight %) of B on $B_2O_3$ basis, 70 weight % or more and 85 weight % or less (i.e., from 70 weight % to 85 weight %) of Si on $SiO_2$ basis, and 0 weight % or more and 5 weight % or less (i.e., from 0 weight % to 5 weight %) of Al on $Al_2O_3$ basis, when the total sum is taken as 100 weight %.

The dielectric glass material may further contain, in addition to quartz, alumina ($Al_2O_3$) as a filler. With the dielectric glass material containing quartz as a filler, the high frequency characteristics of the multilayer-type coil component 1 are easily improved. Also, with the dielectric glass material containing alumina as a filler, the mechanical strength of the element body 10A is easily improved.

When the dielectric glass material contains quartz and alumina as fillers, the dielectric glass material preferably contains 60 weight % or more and 66 weight % or less (i.e., from 60 weight % to 66 weight %) of the glass material, 34 weight % or more and 37 weight % or less (i.e., from 34 weight % to 37 weight %) of quartz as a filler, and 0.5 weight % or more and 4 weight % or less (i.e., from 0.5 weight % to 4 weight %) of alumina as a filler, when the total sum is taken as 100 weight %.

In the multilayer-type coil component of the present disclosure, the non-magnetic layer may be configured of a non-magnetic ferrite material containing Fe, Cu, and Zn.

In the multilayer-type coil component 1, the non-magnetic layer 15A may be configured of a non-magnetic ferrite material containing Fe, Cu, and Zn.

The non-magnetic ferrite material preferably contains 40 mol % or more and 49.5 mol % or less (i.e., from 40 mol % to 49.5 mol %) of Fe on $Fe_2O_3$ basis, 4 mol % or more and 12 mol % or less (i.e., from 4 mol % to 12 mol %) of Cu on CuO basis, and Zn being the balance on ZnO basis, when the total sum is taken as 100 mol %.

The non-magnetic ferrite material may further contain an additive such as Mn, Bi, Co, Si, or Sn.

The non-magnetic ferrite material may further contain inevitable impurities.

The non-magnetic layer 15A may be configured of an oxide represented by $aZnO \cdot SiO_2$ (a is larger than or equal to 1.8 and smaller than or equal to 2.2 (i.e., from 1.8 to 2.2)). This oxide can be, for example, $Zn_2SiO_4$ called Willemite, or the like. In this oxide, part of Zn may be substituted by Cu.

The magnetic layer 15B may be preferably configured of a Ni—Cu—Zn-based ferrite material containing Fe, Ni, Zn, and Cu. In this case, the inductance of the multilayer-type coil component 1 is easily increased.

The Ni—Cu—Zn-based ferrite material preferably contains 40 mol % or more and 49.5 mol % or less (i.e., from 40 mol % to 49.5 mol %) of Fe on $Fe_2O_3$ basis, 5 mol % or more and 35 mol % or less (i.e., from 5 mol % to 35 mol %) of Zn on ZnO basis, 4 mol % or more and 12 mol % or less (i.e., from 4 mol % to 12 mol %) of Cu on CuO basis, and Ni being the balance on NiO basis, when the total sum is taken as 100 mol %.

The Ni—Cu—Zn-based ferrite material may further contain an additive such as Mn, Bi, Co, Si, or Sn.

The Ni—Cu—Zn-based ferrite material may further contain inevitable impurities.

The non-magnetic layer and the magnetic layer are distinguished as follows. First, by polishing the multilayer-type coil component, a section along the length direction and the height direction as depicted in FIG. 5 and FIG. 6 is exposed. Next, for a region where a different layer can be estimated to be present on the exposed section of the element body (for example, a region where a different layer can be estimated to be present based on a difference in color tone or the like), a composition (percentage of content of an element to be detected) is obtained by scanning transmission electron microscope-energy dispersive X-ray spectroscopy (STEM-EDX). Then, from the obtained composition, it is determined whether the constituent material in each region is a non-magnetic material or a magnetic material to distinguish between a non-magnetic layer and a magnetic layer.

The multilayer-type coil component 1 is manufactured by, for example, a method below.

<Non-Magnetic Material Fabricating Process>

First, $K_2O$, $B_2O_3$, $SiO_2$, and $Al_2O_3$ are measured so as to each have a predetermined ratio, and they are mixed inside a platinum-made crucible or the like.

Next, the obtained mixture is fired to be melted. The firing temperature is set to be, for example, 1500° C. or higher and 1600° C. or lower.

Then, the obtained melt is rapidly cooled to fabricate a glass material.

The glass material preferably contains 0.5 weight % or more and 5 weight % or less (i.e., from 0.5 weight % to 5 weight %) of K on $K_2O$ basis, 10 weight % or more and 25 weight % or less (i.e., from 10 weight % to 25 weight %) of B on $B_2O_3$ basis, 70 weight % or more and 85 weight % or less (i.e., from 70 weight % to 85 weight %) of Si on $SiO_2$ basis, and 0 weight % or more and 5 weight % or less (i.e., from 0 weight % to 5 weight %) of Al on $Al_2O_3$ basis, when the total sum is taken as 100 weight %.

Next, the glass material is crushed to obtain glass powder. The glass powder has an average particle diameter $D_{50}$ of, for example, being 1 μm or larger and 3 μm or smaller (i.e., from 1 μm to 3 μm). Also, as fillers, quartz powder and alumina powder are prepared. The quartz powder and the alumina powder have an average particle diameter $D_{50}$ of, for example, being 0.5 μm or larger and 2.0 μm or smaller (i.e., from 0.5 μm to 2.0 μm). Here, the average particle diameter $D_{50}$ is a particle diameter corresponding to 50% in volume-based cumulative percentage.

Then, to the glass powder, the quartz powder and the alumina powder are added as fillers to fabricate a non-magnetic material, more specifically, a glass ceramic material (dielectric glass material).

<Non-Magnetic Sheet Fabricating Process>

First, the glass ceramic material, an organic binder such as polyvinyl-butyral-based resin, an organic solvent such as ethanol or toluene, a plasticizer, and so forth are put into a ball mill together with a PSZ medium and mixed to fabricate glass ceramic slurry.

Next, the glass ceramic slurry is formed into a sheet shape having a predetermined thickness, for example, larger than or equal to 20 μm and smaller than or equal to 30 μm (i.e., from 20 μm to 30 μm), by a doctor blade method or the like, and then is punched out into a predetermined shape such as a rectangular shape, thereby fabricating a non-magnetic sheet, more specifically, a glass ceramic sheet.

<Magnetic Material Fabricating Process>

First, $Fe_2O_3$, ZnO, CuO, and NiO are measured so as to each have a predetermined ratio.

Next, these measured substances, pure water, a dispersant, and so forth are put into a ball mill together with a PSZ medium and mixed, and then crushed.

Then, the obtained crushed substance is dried, and is then calcined. The calcining temperature is set to be, for example, 700° C. or higher and 800° C. or lower. The calcining time is set to be, for example, two hours or more and three hours or less (i.e., from two hours to three hours).

In this manner, a powdered magnetic material, more specifically, a powdered magnetic ferrite material, is fabricated.

The magnetic ferrite material preferably contains 40 mol % or more and 49.5 mol % or less (i.e., from 40 mol % to 49.5 mol %) of Fe on $Fe_2O_3$ basis, 5 mol % or more and 35 mol % or less (i.e., from 5 mol % to 35 mol %) of Zn on ZnO basis, 4 mol % or more and 12 mol % or less (i.e., from 4 mol % to 12 mol %) of Cu on CuO basis, and Ni being the balance on NiO basis, when the total sum is taken as 100 mol %.

<Magnetic Sheet Fabricating Process>

First, a powdered magnetic ferrite material, an organic binder such as polyvinyl-butyral-based resin, an organic solvent such as ethanol or toluene, and so forth are put into a ball mill together with a PSZ medium and mixed, and then crushed, thereby fabricating magnetic ferrite slurry.

Next, the magnetic ferrite slurry is formed into a sheet shape having a predetermined thickness, for example, larger than or equal to 20 μm and smaller than or equal to 30 μm (i.e., from 20 μm to 30 μm), by a doctor blade method or the like, and then is punched out into a predetermined shape such as a rectangular shape, thereby fabricating a magnetic sheet, more specifically, a magnetic ferrite sheet.

<Conductor Pattern Forming Process>

Each glass ceramic sheet is coated with a conductive paste such as a Ag paste by screen printing or the like, thereby forming a conductor pattern for coil conductors corresponding to the coil conductors depicted in FIG. 7 and FIG. 8, a conductor pattern for extended conductors corresponding to the extended conductors depicted in FIG. 7 and FIG. 8, and a conductor pattern for via conductors corresponding to the via conductors depicted in FIG. 7 and FIG. 8. To form a conductor pattern for via conductors, laser radiation is conducted at a predetermined location on the glass ceramic sheet to form a via hole in advance, and that via hole is filled with the conductive paste.

<Multilayer Body Block Fabricating Process>

First, glass ceramic sheets each having the conductor patterns formed thereon are stacked in a sequence depicted in FIG. 7 and FIG. 8 in the laminating direction, here, the length direction. Here, a predetermined number of glass ceramic sheets each having no conductor pattern formed thereon may be stacked on at least one end face of the obtained multilayer body in the laminating direction, here, the length direction.

Next, a predetermined number of magnetic ferrite sheets are stacked on both end faces of the obtained multilayer body of the glass ceramic sheets in the laminating direction, here, the length direction.

Then, the obtained multilayer body of the glass ceramic sheets and the magnetic ferrite sheets is pressure-bonded by warm isostatic press (WIP) process or the like to fabricate a multilayer body block. The temperature at the time of pressure boding is set to be, for example, 70° C. or higher and 90° C. or lower. The pressure at the time of pressure boding is set to be, for example, 60 MPa or higher and 100 MPa or less (i.e., from 60 MPa to 100 MPa).

<Element Body and Coil Fabricating Process>

First, the multilayer body block is cut into a predetermined size by a dicer or the like, thereby fabricating individual chips.

Next, the individual chips are fired. The firing temperature is set to be, for example, 900° C. or higher and 920° C. or lower. The firing time is set to be, for example, one hour or more and four hours or less (i.e., from one hour to four hours).

By firing the individual chips, the glass ceramic sheet and the magnetic ferrite sheet each become an insulating layer. More specifically, the glass ceramic sheet and the magnetic ferrite sheet become a non-magnetic layer and a magnetic layer, respectively. Furthermore, the conductor pattern for coil conductors, the conductor pattern for extended conductors, and the conductor pattern for via conductors become a coil conductor, an extended conductor, and a via conductor, respectively.

In this manner, an element body formed with a plurality of insulating layers laminated in a laminating direction, here, a length direction, a first coil provided inside the element body, and a second coil provided inside the element body and insulated from the first coil are fabricated. Here, to a first principal surface of the element body, a first extended conductor connected to one end of the first coil, a second extended conductor connected to the other end of the first coil, and a third extended conductor connected to one end of the second coil, and a fourth extended conductor connected to the other end of the second coil are exposed.

As for the element body, its corner portion and ridge portion may be rounded by, for example, putting the element body into a rotating barrel machine together with a medium and subjecting the element body to barrel polishing.

<Outer Electrode Forming Process>

First, at least four locations on the first principal surface of the element body, that is, a portion where the first extended conductor is exposed, a portion where the second extended conductor is exposed, a portion where the third extended conductor is exposed, and a portion where the fourth extended conductor is exposed, are coated with a conductive paste such as a paste containing Ag and glass frit.

Next, each obtained coat is baked to form a base electrode layer on the first principal surface of the element body. The baking temperature is set to be, for example, 800° C. or higher and 820° C. or lower.

Then, by electrolytic plating or the like, plated layers, for example, a Ni-plated layer and a Sn-plated layer, are sequentially formed on a surface of each base electrode layer. Each plated layer has a thickness of, for example, 3 μm.

In this manner, a first outer electrode electrically connected to one end of the first coil via the first extended conductor, a second outer electrode electrically connected to the other end of the first coil via the second extended conductor, a third outer electrode electrically connected to one end of the second coil via the third extended conductor, and a fourth outer electrode electrically connected to the other end of the second coil via the fourth extended conductor are formed.

In the manner described above, the multilayer-type coil component 1 is manufactured.

Embodiment 2

In the multilayer-type coil component of the present disclosure, the element body preferably has, as an insulating layer, an inner magnetic portion provided inside the non-magnetic layer. The inner magnetic portion is preferably provided on an inner circumferential side of the first coil conductor and the second coil conductor when viewed from the laminating direction, and is connected to the magnetic layer. A multilayer-type coil component in a mode different in the above-described point from that of the multilayer-type coil component of Embodiment 1 of the present disclosure is described below as a multilayer-type coil component of Embodiment 2 of the present disclosure.

Figure 9:
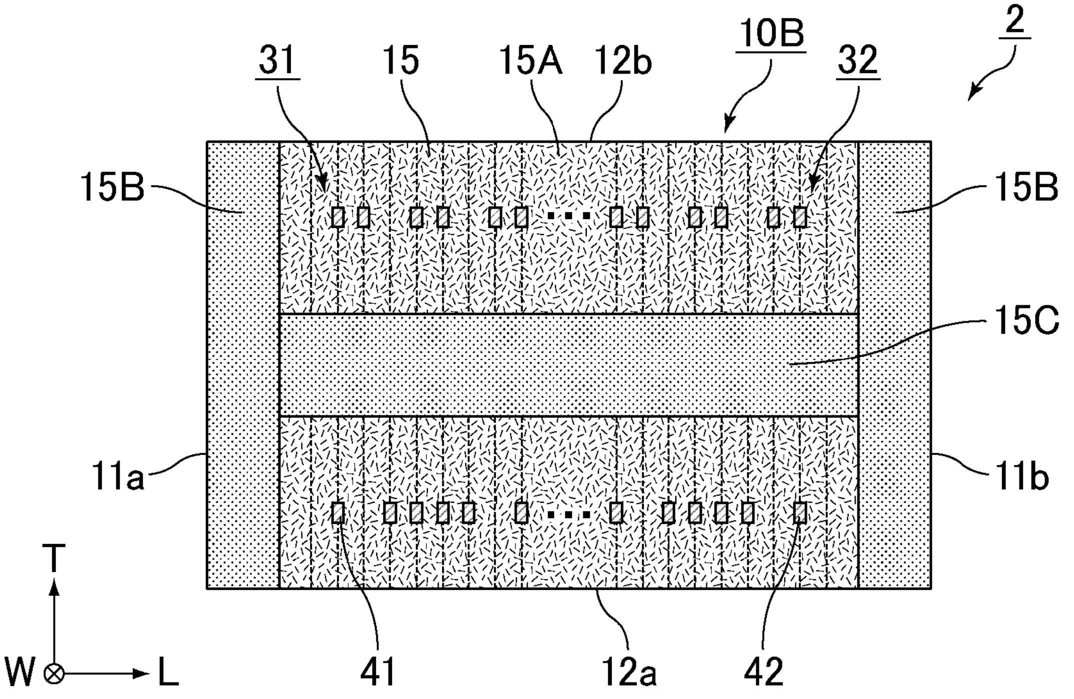
FIG. 9 is a sectional schematic view depicting one example of a multilayer-type coil component of Embodiment 2 of the present disclosure.

FIG. 9 is a sectional schematic view depicting one example of the multilayer-type coil component of Embodiment 2 of the present disclosure.

In a multilayer-type coil component 2 depicted in FIG. 9, an element body 10B has a non-magnetic layer 15A and magnetic layers 15B as well as an inner magnetic portion 15C, as insulating layers 15.

The inner magnetic portion 15C is provided inside the non-magnetic layer 15A.

The inner magnetic portion 15C is connected to the magnetic layers 15B. More specifically, the inner magnetic portion 15C extends to the laminating direction, here, the length direction L, inside the non-magnetic layer 15A, and has one end connected to one magnetic layer 15B and the other end connected to the other magnetic layer 15B.

The inner magnetic portion 15C is provided on an inner circumferential side of the first coil conductor and the second coil conductor when viewed from the laminating direction, here, the length direction L.

In the specification, the inner circumferential side of the coil conductor means an outer side portion of the coil conductor opposite to the outer circumference with respect to the inner circumference of the coil conductor.

Figure 10:
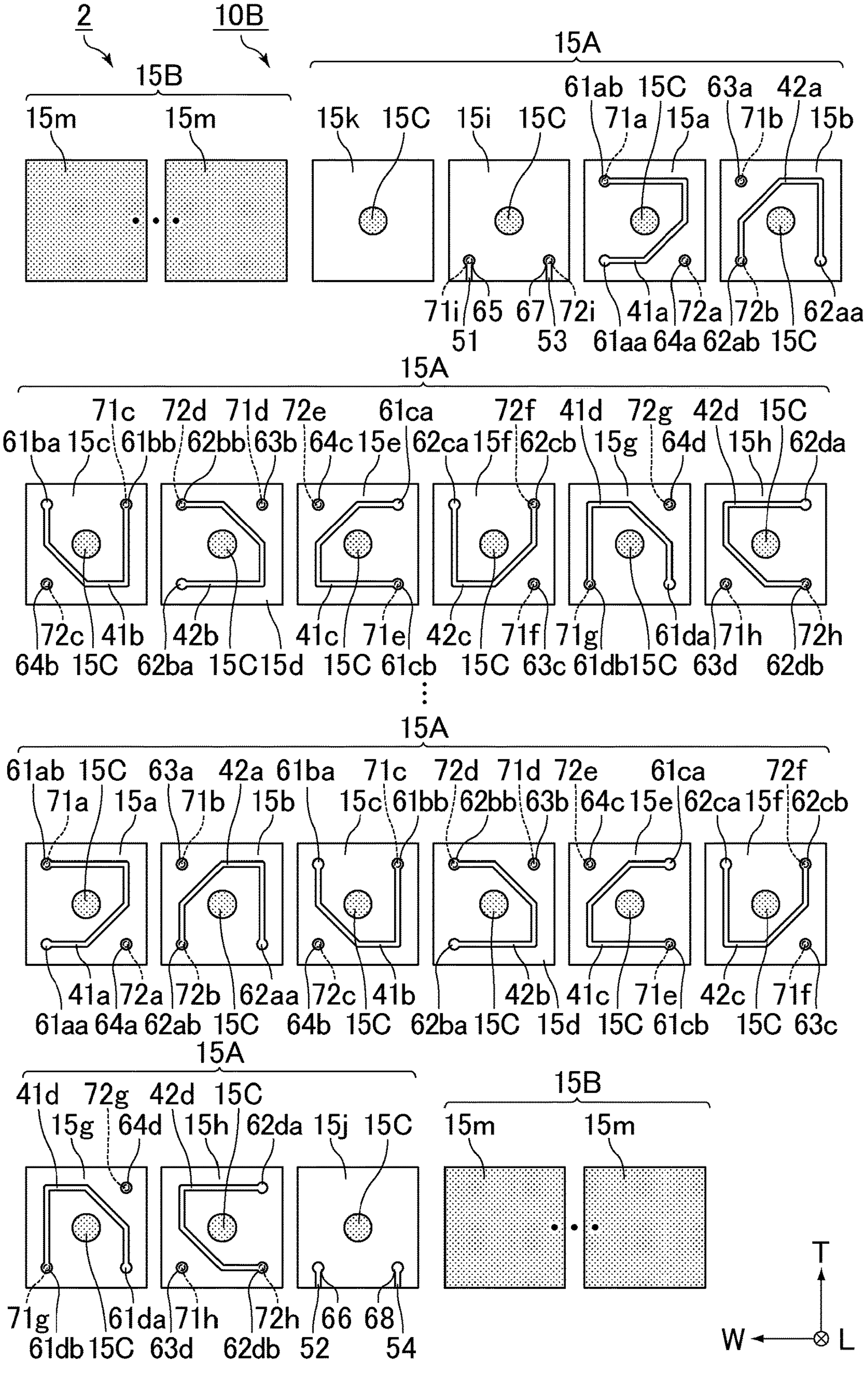
FIG. 10 is a plan schematic view depicting one example of an element body and a coil depicted in FIG. 9 as being disassembled.

FIG. 10 is a plan schematic view depicting one example of an element body and a coil depicted in FIG. 9 as being disassembled.

In the example depicted in FIG. 10, when viewed from the laminating direction, here, the length direction L, the inner magnetic portion 15C is provided on an inner circumferential side of the first coil conductor 41*a*, the first coil conductor 41*b*, the first coil conductor 41*c*, the first coil conductor 41*d*, the second coil conductor 42*a*, the second coil conductor 42*b*, the second coil conductor 42*c*, and the second coil conductor 42*d*.

In the multilayer-type coil component 2, the inner magnetic portion 15C is provided as depicted in FIG. 9 and FIG. 10. Thus, inductance is easily increased significantly.

As with the magnetic layers 15B, the inner magnetic portion 15C is preferably configured of a Ni—Cu—Zn-based ferrite material containing Fe, Ni, Zn, and Cu. In this case, the inductance of the multilayer-type coil component 2 is easily increased.

The multilayer-type coil component 2 is manufactured by, for example, a method below.

<Non-Magnetic Material Fabricating Process>

In a manner similar to that of <Non-Magnetic Material Fabricating Process> in the method of manufacturing the multilayer-type coil component 1 described above, a non-magnetic material, more specifically, a glass ceramic material (dielectric glass material), is fabricated.

<Non-Magnetic Sheet Fabricating Process>

In a manner similar to that of <Non-Magnetic Sheet Fabricating Process> in the method of manufacturing the multilayer-type coil component 1 described above, a non-magnetic sheet, more specifically, a glass ceramic sheet, is fabricated.

<Magnetic Material Fabricating Process>

In a manner similar to that of <Magnetic Material Fabricating Process> in the method of manufacturing the multilayer-type coil component 1 described above, a powdered magnetic material, more specifically, a powdered magnetic ferrite material, is fabricated.

<Magnetic Sheet Fabricating Process>

In a manner similar to that of <Magnetic Sheet Fabricating Process> in the method of manufacturing the multilayer-type coil component 1 described above, a magnetic sheet, more specifically, a magnetic ferrite sheet, is fabricated.

<Conductor Pattern Forming Process>

In a manner similar to that of <Conductor Patten Forming Process> in the method of manufacturing the multilayer-type coil component 1 described above, for each glass ceramic sheet, a conductor pattern for coil conductors corresponding to the coil conductors depicted in FIG. 10, a conductor pattern for extended conductors corresponding to the extended conductors depicted in FIG. 10, and a conductor pattern for via conductors corresponding to the via conductors depicted in FIG. 10 are formed.

<Magnetic Paste Fabricating Process>

The powdered magnetic ferrite material obtained in <Magnetic Material Fabricating Process> described above, a solvent such as a ketone-based solvent, a resin such as polyvinyl acetal, a plasticizer such as an alkyd-based plasticizer, and so forth are blended by a planetary mixer or the like, and then are dispersed by a triple roll mill or the like, thereby fabricating a magnetic paste, more specifically, a magnetic ferrite paste.

<Multilayer Body Block Fabricating Process>

First, glass ceramic sheets each having the conductor patterns formed thereon are stacked in a sequence depicted in FIG. 10 in the laminating direction, here, the length direction. Here, a predetermined number of glass ceramic sheets each having no conductor pattern formed thereon may be stacked on at least one end face of the obtained multilayer body in the laminating direction, here, the length direction.

Next, the obtained multilayer body of the glass ceramic sheets are provisionally pressure-bonded.

Then, for the multilayer body of the glass ceramic sheets, a predetermined location, more specifically, a location on an inner circumferential side of the conductor pattern for coil conductors when viewed from the laminating direction, here, the length direction, is subjected to sandblasting or the like, thereby forming a through hole in the laminating direction, here, the length direction.

Then, for the multilayer body of the glass ceramic sheets, each through hole is filled with the magnetic ferrite paste, and then a predetermined number of magnetic ferrite sheets are stacked on both end faces in the laminating direction, here, the length direction.

Then, the obtained multilayer body of the glass ceramic sheets and the magnetic ferrite sheets is subjected to thermocompression bonding, thereby fabricating a multilayer body block.

<Element Body and Coil Fabricating Process>

In a manner similar to that of <Element body and Coil Fabricating Process> in the method of manufacturing the multilayer-type coil component 1 described above, an element body, a first coil, and a second coil are fabricated. Here, the magnetic ferrite paste with which the through holes of the multilayer body of the glass ceramic sheets is filled becomes an inner magnetic portion.

<Outer Electrode Forming Process>

In a manner similar to that of <Outer Electrode Forming Process> in the method of manufacturing the multilayer-type coil component 1 described above, a first outer electrode, a second outer electrode, a third outer electrode, and a fourth outer electrode are formed.

In the manner described above, the multilayer-type coil component 2 is manufactured.

Embodiment 3

In the multilayer-type coil component of the present disclosure, when a section along the laminating direction is viewed, a dimension of the inner magnetic portion in a direction orthogonal to the laminating direction may be different between a position where the inner magnetic portion overlaps each of the first coil conductor and the second coil conductor in a direction orthogonal to the laminating direction and other positions. A multilayer-type coil component in a mode different in the above-described point from that of the multilayer-type coil component of Embodiment 2 of the present disclosure is described below as a multilayer-type coil component of Embodiment 3 of the present disclosure.

Figure 11:
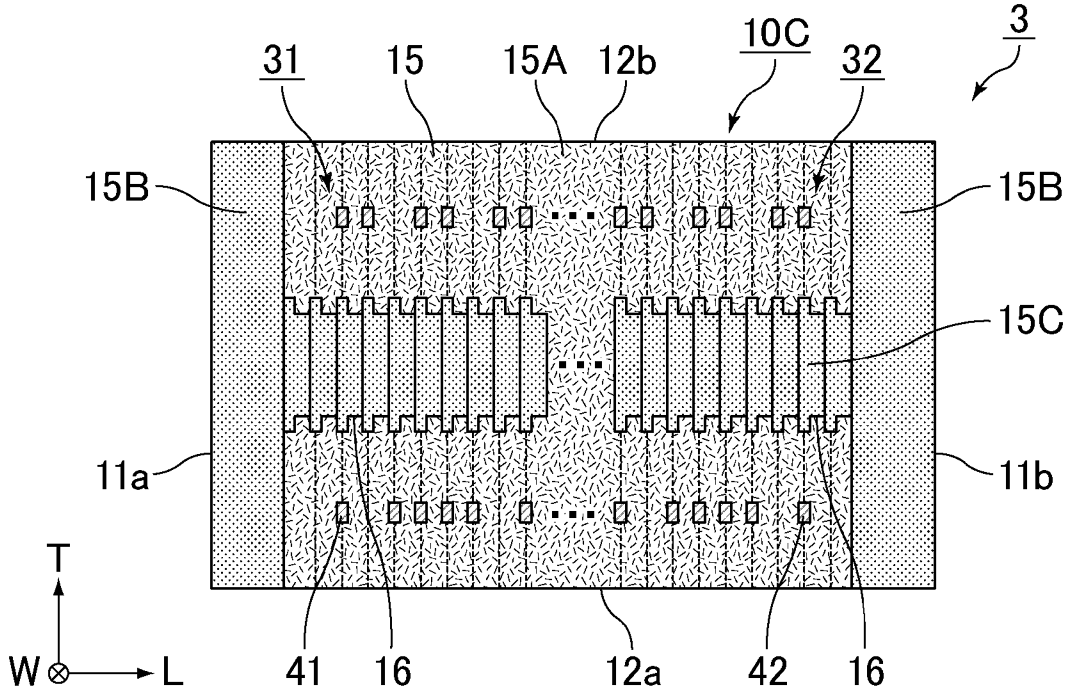
FIG. 11 is a sectional schematic view depicting one example of a multilayer-type coil component of Embodiment 3 of the present disclosure.

FIG. 11 is a sectional schematic view depicting one example of the multilayer-type coil component of Embodiment 3 of the present disclosure.

In a multilayer-type coil component 3 depicted in FIG. 11, when a section along the laminating direction, here, a section along the length direction L and the height direction T, is viewed, a dimension of the inner magnetic portion 15C in a direction orthogonal to the laminating direction, here, the height direction T, is larger at a position where the inner magnetic portion 15C overlaps each of the first coil conductor and the second coil conductor in the direction orthogonal to the laminating direction, here, the height direction T, than at other positions.

Note that in the multilayer-type coil component 3, when a section along the laminating direction is viewed, a dimension of the inner magnetic portion 15C in the direction orthogonal to the laminating direction may be smaller at the position where the inner magnetic portion 15C overlaps each of the first coil conductor and the second coil conductor in the direction orthogonal to the laminating direction than at other positions.

Figure 12:
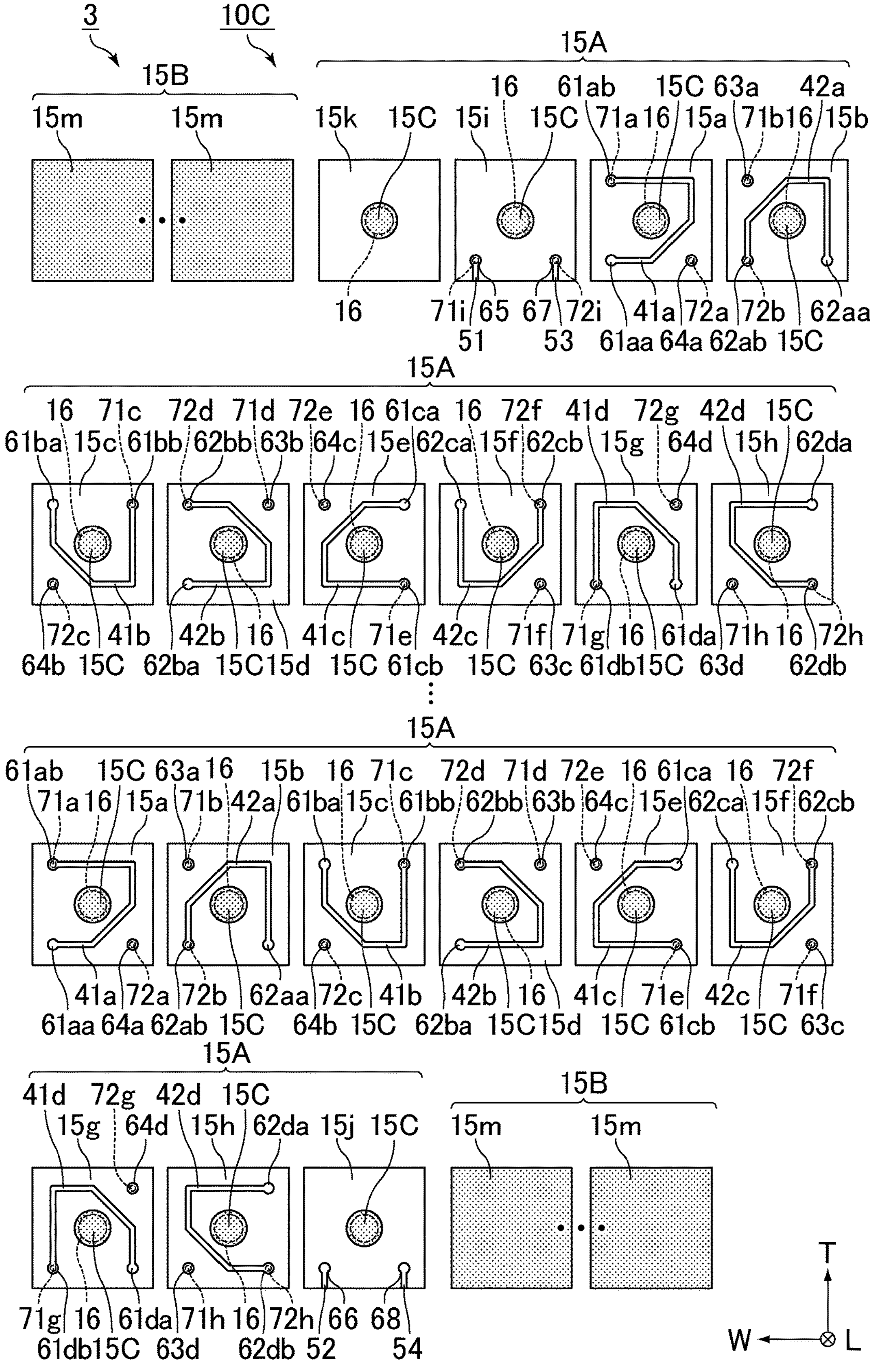
FIG. 12 is a plan schematic view depicting one example of an element body and a coil depicted in FIG. 11 as being disassembled.

FIG. 12 is a plan schematic view depicting one example of an element body and a coil depicted in FIG. 11 as being disassembled.

In an element body 10C of the multilayer-type coil component 3 depicted in FIG. 12, the inner magnetic portion 15C is provided inside a through hole 16 penetrating through the insulating layer in the laminating direction, here, the length direction L, so as to extend on the principal surface of the insulating layer. That is, when viewed from the laminating direction, here, the length direction L, the area of the inner magnetic portion 15C is larger on the principal surface of the insulating layer, that is, on the same plane as each first coil conductor and each second coil conductor, than inside the through hole 16 provided in the insulating layer.

The number of through holes 16 provided in one insulating layer may be one as depicted in FIG. 12 or may be plural.

The multilayer-type coil component 3 is manufactured by, for example, a method below.

<Non-Magnetic Material Fabricating Process>

In a manner similar to that of <Non-Magnetic Material Fabricating Process> in the method of manufacturing the multilayer-type coil component 1 described above, a non-magnetic material, more specifically, a glass ceramic material (dielectric glass material), is fabricated.

<Non-Magnetic Sheet Fabricating Process>

In a manner similar to that of <Non-Magnetic Sheet Fabricating Process> in the method of manufacturing the multilayer-type coil component 1 described above, a non-magnetic sheet, more specifically, a glass ceramic sheet, is fabricated.

<Magnetic Material Fabricating Process>

In a manner similar to that of <Magnetic Material Fabricating Process> in the method of manufacturing the multilayer-type coil component 1 described above, a powdered magnetic material, more specifically, a powdered magnetic ferrite material, is fabricated.

<Magnetic Sheet Fabricating Process>

In a manner similar to that of <Magnetic Sheet Fabricating Process> in the method of manufacturing the multilayer-type coil component 1 described above, a magnetic sheet, more specifically, a magnetic ferrite sheet, is fabricated.

<Conductor Pattern Forming Process>

In a manner similar to that of <Conductor Patten Forming Process> in the method of manufacturing the multilayer-type coil component 1 described above, for each glass ceramic sheet, a conductor pattern for coil conductors corresponding to the coil conductors depicted in FIG. 12, a conductor pattern for extended conductors corresponding to the extended conductors depicted in FIG. 12, and a conductor pattern for via conductors corresponding to the via conductors depicted in FIG. 12 are formed.

<Magnetic Paste Fabricating Process>

The powdered magnetic ferrite material obtained in <Magnetic Material Fabricating Process> described above, a solvent such as a ketone-based solvent, a resin such as polyvinyl acetal, a plasticizer such as an alkyd-based plasticizer, and so forth are blended by a planetary mixer or the like, and then are dispersed by a triple roll mill or the like, thereby fabricating a magnetic paste, more specifically, a magnetic ferrite paste.

<Magnetic Paste Layer Forming Process>

First, laser radiation is conducted at a predetermined location on the glass ceramic sheet, more specifically, a location on an inner circumferential side of the conductor pattern for coil conductors when viewed from the laminating direction, here, the length direction, to form a through hole.

Next, the through hole of the glass ceramic sheet is filled with the magnetic ferrite paste by screen printing or the like, and coating is performed so that the magnetic ferrite paste spreads on the principal surface of the glass ceramic sheet. With this, for the glass ceramic sheet, a magnetic paste layer corresponding to the inner magnetic portion depicted in FIG. 11 and FIG. 12, more specifically, a magnetic ferrite paste layer, is formed.

<Multilayer Body Block Fabricating Process>

First, glass ceramic sheets each having the conductor patterns and the magnetic ferrite paste layer formed thereon are stacked in a sequence depicted in FIG. 12 in the laminating direction, here, the length direction.

Next, a predetermined number of magnetic ferrite sheets are stacked on both end faces of the obtained multilayer body of the glass ceramic sheets in the laminating direction, here, the length direction.

Then, the obtained multilayer body of the glass ceramic sheets and the magnetic ferrite sheets is subjected to thermocompression bonding, thereby fabricating a multilayer body block.

<Element body and Coil Fabricating Process>

In a manner similar to that of <Element body and Coil Fabricating Process> in the method of manufacturing the multilayer-type coil component 1 described above, an element body, a first coil, and a second coil are fabricated. Here, the magnetic ferrite paste layer becomes an inner magnetic portion.

<Outer Electrode Forming Process>

In a manner similar to that of <Outer Electrode Forming Process> in the method of manufacturing the multilayer-type coil component 1 described above, a first outer electrode, a second outer electrode, a third outer electrode, and a fourth outer electrode are formed.

In the manner described above, the multilayer-type coil component 3 is manufactured.

Embodiment 4

In the multilayer-type coil component of the present disclosure, the non-magnetic layer may be configured of a non-magnetic ferrite material containing Fe, Cu, and Zn, and the inner magnetic portion may be configured of a Ni-containing material which contains Ni. A multilayer-type coil component in a mode different in the above-described point from that of the multilayer-type coil component of Embodiment 2 of the present disclosure and the multilayer-type coil component of Embodiment 3 of the present disclosure is described below as a multilayer-type coil component of Embodiment 4 of the present disclosure.

Figure 13:
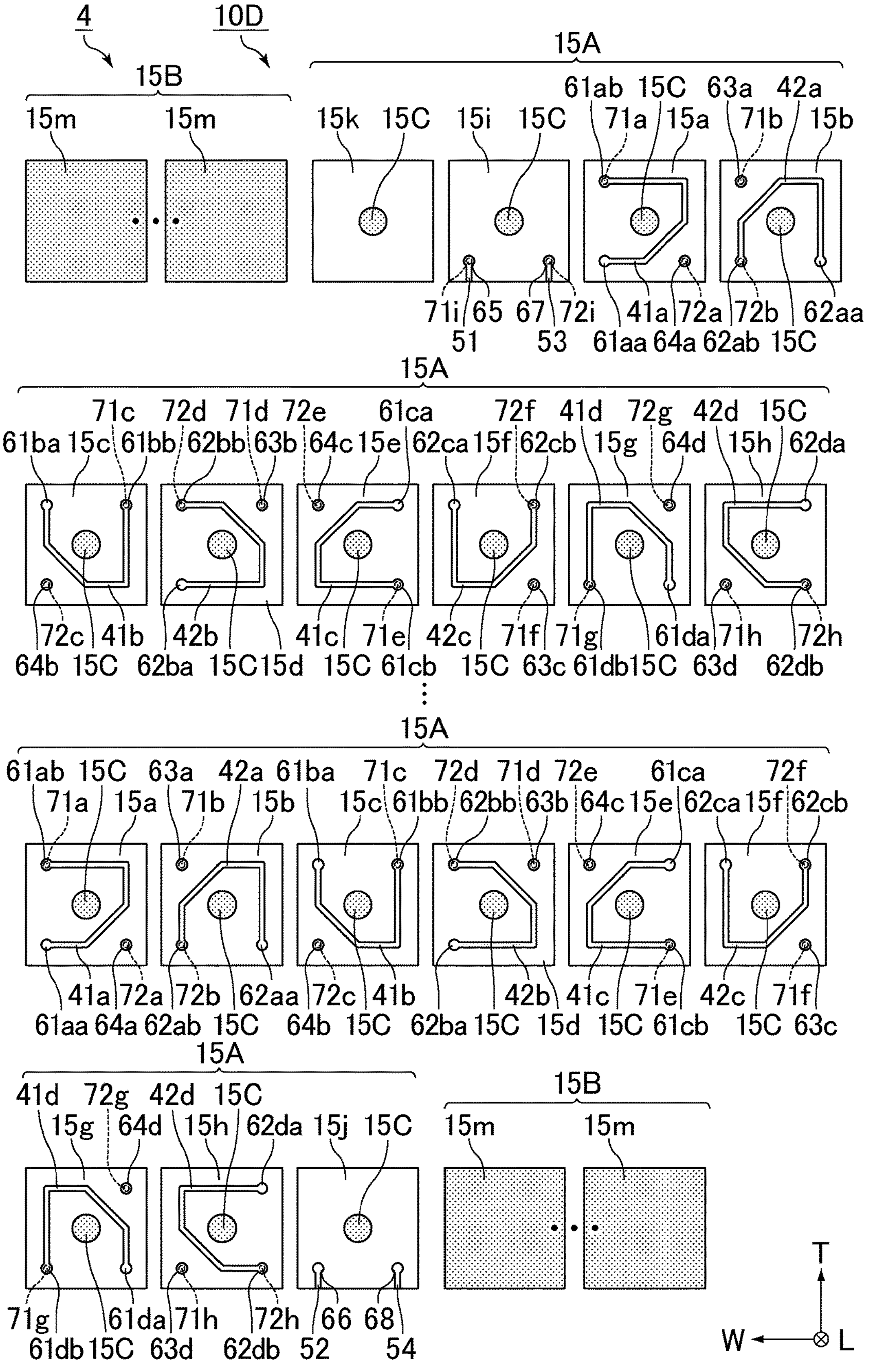
FIG. 13 is a plan schematic view depicting one example of a multilayer-type coil component of Embodiment 4 of the present disclosure, with an element body and a coil as being disassembled.

FIG. 13 is a plan schematic view depicting one example of the multilayer-type coil component of Embodiment 4 of the present disclosure, with an element body and a coil as being disassembled.

In an element body 10D of a multilayer-type coil component 4 depicted in FIG. 13, the non-magnetic layer 15A is configured of a non-magnetic ferrite material containing Fe, Cu, and Zn.

The non-magnetic ferrite material preferably contains 40 mol % or more and 49.5 mol % or less (i.e., from 40 mol % to 49.5 mol %) of Fe on $Fe_2O_3$ basis, 4 mol % or more and 12 mol % or less (i.e., from 4 mol % to 12 mol %) of Cu on CuO basis, and Zn being the balance on ZnO basis, when the total sum is taken as 100 mol %.

The non-magnetic ferrite material may further contain an additive such as Mn, Bi, Co, Si, or Sn.

The non-magnetic ferrite material may further contain inevitable impurities.

In the element body 10D depicted in FIG. 13, the inner magnetic portion 15C is configured of a Ni-containing material which contains Ni.

The Ni-containing material which contains Ni is, for example, a Ni—Cu—Zn-based ferrite material or a Ni simple substance.

The Ni—Cu—Zn-based ferrite material preferably contains 40 mol % or more and 49.5 mol % or less (i.e., from 40 mol % to 49.5 mol %) of Fe on $Fe_2O_3$ basis, 5 mol % or more and 35 mol % or less (i.e., from 5 mol % to 35 mol %) of Zn on ZnO basis, 4 mol % or more and 12 mol % or less (i.e., from 4 mol % to 12 mol %) of Cu on CuO basis, and Ni being the balance on NiO basis, when the total sum is taken as 100 mol %.

The Ni—Cu—Zn-based ferrite material may further contain an additive such as Mn, Bi, Co, Si, or Sn.

The Ni—Cu—Zn-based ferrite material may further contain inevitable impurities.

The multilayer-type coil component 4 is manufactured by, for example, a method below.

<Non-Magnetic Material Fabricating Process>

First, $Fe_2O_3$, CuO, and ZnO are measured so as to each have a predetermined ratio.

Next, these measured substances, pure water, a dispersant, and so forth are put into a ball mill together with a PSZ medium and mixed, and then crushed.

Then, the obtained crushed substance is dried, and is then calcined. The calcining temperature is set to be, for example, 700° C. or higher and 800° C. or lower. The calcining time is set to be, for example, two hours or more and three hours or less (i.e., from two hours to three hours).

In this manner, a powdered non-magnetic material, more specifically, a powdered non-magnetic ferrite material, is fabricated.

The non-magnetic ferrite material preferably contains 40 mol % or more and 49.5 mol % or less (i.e., from 40 mol % to 49.5 mol %) of Fe on $Fe_2O_3$ basis, 4 mol % or more and 12 mol % or less (i.e., from 4 mol % to 12 mol %) of Cu on CuO basis, and Zn being the balance on ZnO basis, when the total sum is taken as 100 mol %.

<Non-Magnetic Sheet Fabricating Process>

First, a powdered non-magnetic ferrite material, an organic binder such as polyvinyl-butyral-based resin, an organic solvent such as ethanol or toluene, and so forth are put into a ball mill together with a PSZ medium and mixed, and then crushed, thereby fabricating non-magnetic ferrite slurry.

Next, the non-magnetic ferrite slurry is formed into a sheet shape having a predetermined thickness, for example, larger than or equal to 20 μm and smaller than or equal to 30 μm (i.e., from 20 μm to 30 μm), by a doctor blade method or the like, and then is punched out into a predetermined shape such as a rectangular shape, thereby fabricating a non-magnetic sheet, more specifically, a non-magnetic ferrite sheet.

<Magnetic Material Fabricating Process>

In a manner similar to that of <Magnetic Material Fabricating Process> in the method of manufacturing the multilayer-type coil component 1 described above, a powdered magnetic material, more specifically, a powdered magnetic ferrite material, is fabricated.

<Magnetic Sheet Fabricating Process>

In a manner similar to that of <Magnetic Sheet Fabricating Process> in the method of manufacturing the multilayer-type coil component 1 described above, a magnetic sheet, more specifically, a magnetic ferrite sheet, is fabricated.

<Conductor Pattern Forming Process>

Each non-magnetic ferrite sheet is coated with a conductive paste such as a Ag paste by screen printing or the like, thereby forming a conductor pattern for coil conductors corresponding to the coil conductors depicted in FIG. 13, a conductor pattern for extended conductors corresponding to the extended conductors depicted in FIG. 13, and a conductor pattern for via conductors corresponding to the via conductors depicted in FIG. 13. To form a conductor pattern for via conductors, laser radiation is conducted at a predetermined location on the non-magnetic ferrite sheet to form a via hole in advance, and that via hole is filled with the conductive paste.

<Magnetic Paste Fabricating Process>

A Ni-containing material, a solvent such as a ketone-based solvent, a resin such as polyvinyl acetal, and a plasticizer such as an alkyd-based plasticizer, and so forth are blended by a planetary mixer or the like, and then are dispersed by a triple roll mill or the like, thereby fabricating a magnetic paste, more specifically, a Ni-containing material paste.

<Magnetic Paste Layer Forming Process>

A predetermined location on the non-magnetic ferrite sheet, more specifically, a location on an inner circumferential side of the conductor pattern for coil conductors when viewed from the laminating direction, here, the length direction, is coated with the Ni-containing material paste by screen printing or the like. With this, a magnetic paste layer, more specifically, a Ni-containing material paste layer, is formed on the principal surface of the non-magnetic ferrite sheet.

<Multilayer Body Block Fabricating Process>

First, non-magnetic ferrite sheets each having the conductor patterns and the Ni-containing material paste layer formed thereon are stacked in a sequence depicted in FIG. 13 in the laminating direction, here, the length direction.

Next, a predetermined number of magnetic ferrite sheets are stacked on both end faces of the obtained multilayer body of the non-magnetic ferrite sheets in the laminating direction, here, the length direction.

Then, the obtained multilayer body of the non-magnetic ferrite sheets and the magnetic ferrite sheets is subjected to thermocompression bonding, thereby fabricating a multilayer body block.

<Element Body and Coil Fabricating Process>

In a manner similar to that of <Element body and Coil Fabricating Process> in the method of manufacturing the multilayer-type coil component 1 described above, an element body, a first coil, and a second coil are fabricated. Here, the non-magnetic ferrite sheets and the magnetic ferrite sheets become non-magnetic layers and magnetic layers, respectively. Furthermore, Ni contained in the Ni-containing material paste layer diffuses inside the non-magnetic ferrite sheets at the time of firing. Since a location inside the non-magnetic ferrite sheets where Ni diffuses has magnetism, Ni-containing material paste layers adjacent to each other in the laminating direction, here, the length direction L, are connected to each other with Ni diffusing inside the non-magnetic ferrite sheet interposing therebetween, thereby forming an inner magnetic portion. In this manner, in the present embodiment, unlike Embodiment 2 and Embodiment 3 described above, the inner magnetic portion can be formed without performing processing such as forming a through hole in a non-magnetic sheet.

<Outer Electrode Forming Process>

In a manner similar to that of <Outer Electrode Forming Process> in the method of manufacturing the multilayer-type coil component 1 described above, a first outer electrode, a second outer electrode, a third outer electrode, and a fourth outer electrode are formed.

In the manner described above, the multilayer-type coil component 4 is manufactured.

EXAMPLE

An example which more specifically discloses the multilayer-type coil component of the present disclosure by using a simulation model is described below. Note that the present disclosure is not limited to the following example.

Example 1

As a simulation model of a multilayer-type coil component of Example 1 (hereinafter simply referred to as a "multilayer-type coil component of Example 1"), the multilayer-type coil component of Embodiment 2 of the present disclosure was adopted.

In the multilayer-type coil component of Example 1, the lengths of the first coil conductor and the second coil conductor, the numbers of turns of the first coil and the second coil, and so forth were set so that the impedance at 100 MHz was 100Ω.

In the multilayer-type coil component of Example 1, the dimension in the length direction was set at 2.0 mm, the dimension in the height direction was set at 1.2 mm, and the dimension in the width direction was set at 1.2 mm.

Comparative Example 1

As a simulation model of a multilayer-type coil component of Comparative Example 1 (hereinafter simply referred to as a "multilayer-type coil component of Comparative Example 1"), the multilayer-type coil component having a spiral-shaped coil conductor as depicted in FIG. 2 of Japanese Unexamined Patent Application Publication No. 2014-27072 was adopted.

In the multilayer-type coil component of Comparative Example 1, as with the multilayer-type coil component of Example 1, the lengths of the first coil conductor and the second coil conductor, the numbers of turns of the first coil and the second coil, and so forth were set so that the impedance at 100 MHz was 100Ω.

In the multilayer-type coil component of Comparative Example 1, as with the multilayer-type coil component of Example 1, the dimension in the length direction was set at 2.0 mm, the dimension in the height direction was set at 1.2 mm, and the dimension in the width direction was set at 1.2 mm.

Evaluation

Figure 14:
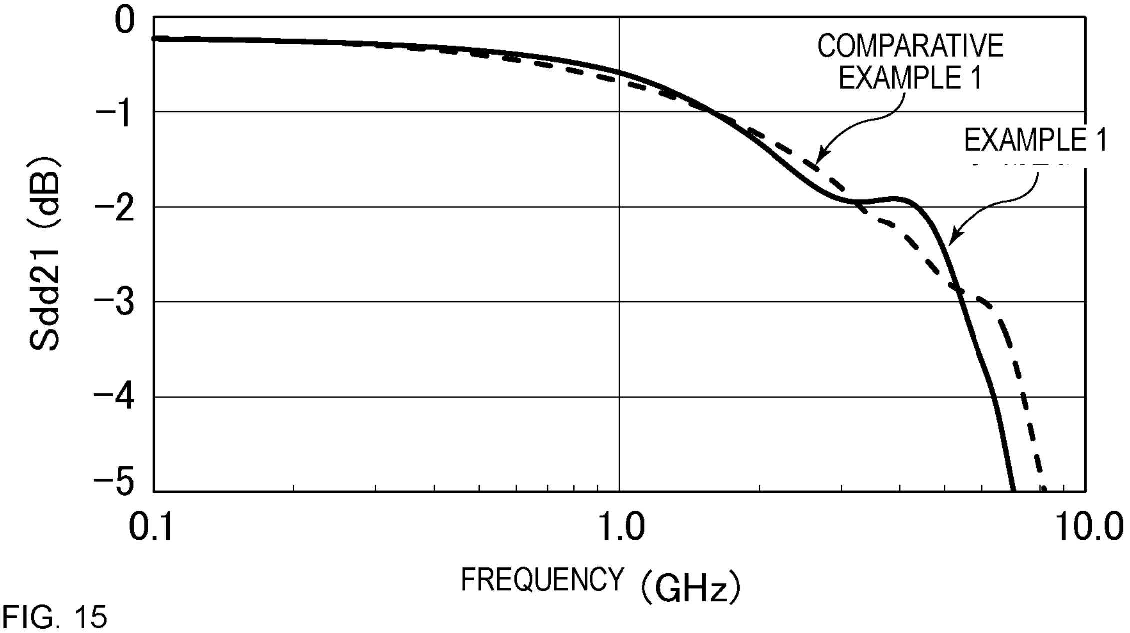
FIG. 14 is a graph indicating simulation results of transmission characteristics of signal components in differential mode with respect to a multilayer-type coil component of Example 1 and a multilayer-type coil component of Comparative Example 1.
Figure 15:
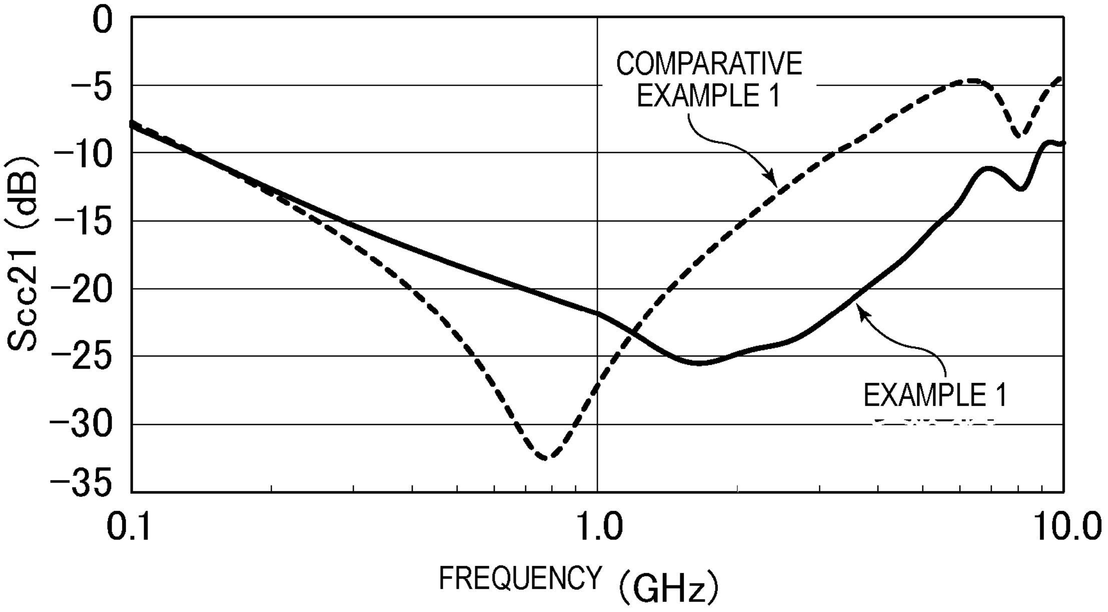
FIG. 15 is a graph indicating simulation results of transmission characteristics of noise components in common mode with respect to the multilayer-type coil component of Example 1 and the multilayer-type coil component of Comparative Example 1.

As for the multilayer-type coil component of Example 1 and the multilayer-type coil component of Comparative Example 1, a simulation evaluation was conducted on transmission characteristics (Sdd21) of signal components in differential mode and transmission characteristics (Scc21) of noise components in common mode FIG. 14 is a graph indicating simulation results of transmission characteristics of signal components in differential mode with respect to the multilayer-type coil component of Example 1 and the multilayer-type coil component of Comparative Example 1. FIG. 15 is a graph indicating simulation results of transmission characteristics of noise components in common mode with respect to the multilayer-type coil component of Example 1 and the multilayer-type coil component of Comparative Example 1.

As depicted in FIG. 14, as for transmission characteristics of signal components in differential mode, there is hardly a difference between the multilayer-type coil component of Example 1 and the multilayer-type coil component of Comparative Example 1. Therefore, in the multilayer-type coil component of Example 1, it can be thought that signal components in differential mode are not attenuated but transmitted.

By contrast, as depicted in FIG. 15, as for transmission characteristics of noise components in common mode, noise components in the multilayer-type coil component of Example 1 are low in the high frequency domain, compared with those of the multilayer-type coil component of Comparative Example 1. That is, in the multilayer-type coil component of Example 1, compared with the multilayer-type coil component of Comparative Example 1, noise components in common mode are attenuated in the high frequency domain. Therefore, according to the multilayer-type coil component of Example 1, it can be thought that noise can be efficiently removed in the high frequency domain.

What is claimed is:

1. A multilayer-type coil component comprising:

an element body including a plurality of insulating layers laminated in a laminating direction;

a first coil inside the element body;

a second coil inside the element body and insulated from the first coil;

a first outer electrode on a surface of the element body and electrically connected to the first coil;

a second outer electrode on the surface of the element body and electrically connected to the first coil;

a third outer electrode on the surface of the element body and electrically connected to the second coil; and a fourth outer electrode on the surface of the element body and electrically connected to the second coil, wherein the laminating direction, a direction of a coil axis of the first coil, and a direction of a coil axis of the second coil are parallel to a mount surface of the element body along a same direction, the first coil comprises a plurality of first coil conductors laminated in the laminating direction being electrically connected, each of the first coil conductors has a length smaller than one turn of the first coil, the second coil comprises a plurality of second coil conductors laminated in the laminating direction being electrically connected, each of the second coil conductors has a length smaller than one turn of the second coil, among the plurality of insulating layers, a first insulating layer includes a first coil conductor of the plurality of first coil conductors and a second insulating layer includes a second coil conductor of the plurality of second coil conductors, the first insulating layer is adjacent to the second insulating layer in the laminating direction, and the first coil conductor of the first insulating layer and the second coil conductor of the second insulating layer are non-rotationally symmetric with respect to each other in a direction perpendicular to the laminating direction regardless of degree of rotation.

2. The multilayer-type coil component according to claim 1, wherein when viewed from the laminating direction, at least one set of the first coil conductors adjacent to each other in the laminating direction takes a shape in a relation of rotational symmetry.

3. The multilayer-type coil component according to claim 2, wherein when viewed from the laminating direction, at least one set of the first coil conductors adjacent to each other in the laminating direction takes a shape in a relation of 90-degree rotational symmetry.

4. The multilayer-type coil component according to claim 1, wherein when viewed from the laminating direction, at least one set of the second coil conductors adjacent to each other in the laminating direction takes a shape in a relation of rotational symmetry.

5. The multilayer-type coil component according to claim 4, wherein when viewed from the laminating direction, at least one set of the second coil conductors adjacent to each other in the laminating direction takes a shape in a relation of 90-degree rotational symmetry.

6. The multilayer-type coil component according to claim 1, wherein when viewed from the laminating direction, each of the first coil conductors does not overlap one end of one of the second coil conductors that is adjacent to the first coil conductor in the laminating direction.

7. The multilayer-type coil component according to claim 6, wherein in the laminating direction, two of the second coil conductors adjacent to one of the first coil conductors which interpose the one first coil conductor are electrically connected to each other via a second coil via conductor which penetrates through the insulating layers in the laminating direction, and when viewed from the laminating direction, the second coil via conductor overlaps each one end of the two second coil conductors on an outer side of perimeter of the one first coil conductor.

8. The multilayer-type coil component according to claim 1, wherein when viewed from the laminating direction, each of the second coil conductors does not overlap one end of one of the first coil conductors that is adjacent to the second coil conductor in the laminating direction.

9. The multilayer-type coil component according to claim 8, wherein in the laminating direction, two of the first coil conductors adjacent to one of the second coil conductors which interpose the one second coil conductor are electrically connected to each other via a first coil via conductor which penetrates through the insulating layers in the laminating direction, and when viewed from the laminating direction, the first coil via conductor overlaps each one end of the two first coil conductors on an outer side of perimeter of the one second coil conductor.

10. The multilayer-type coil component according to claim 1, wherein the element body includes a non-magnetic layer and magnetic layers, both of which are the insulating layers, the magnetic layers interpose the non-magnetic layer in the laminating direction, and the first coil and the second coil are inside the non-magnetic layer.

11. The multilayer-type coil component according to claim 10, wherein the element body includes an inner magnetic portion as the insulating layer, the inner magnetic portion is inside the non-magnetic layer, and the inner magnetic portion is on an inner side of perimeter of the first coil conductors and the second coil conductors when viewed from the laminating direction, and is connected to the magnetic layers.

12. The multilayer-type coil component according to claim 11, wherein when a cross section along the laminating direction is viewed, a dimension of the inner magnetic portion in a direction orthogonal to the laminating direction is different between at a position where the inner magnetic portion overlaps each of the first coil conductors and the second coil conductors in the direction orthogonal to the laminating direction, and at other positions.

13. The multilayer-type coil component according to claim 10, wherein the non-magnetic layer includes a dielectric glass material which contains a glass material containing K, B, and Si, and a filler containing quartz.

14. The multilayer-type coil component according to claim 10, wherein the non-magnetic layer includes a non-magnetic ferrite material which contains Fe, Cu, and Zn.

15. The multilayer-type coil component according to claim 11, wherein the non-magnetic layer includes a non-magnetic ferrite material which contains Fe, Cu, and Zn, and the inner magnetic portion includes a Ni-containing material which contains Ni.

16. The multilayer-type coil component according to claim 2, wherein when viewed from the laminating direction, at least one set of the second coil conductors adjacent to each other in the laminating direction takes a shape in a relation of rotational symmetry.

17. The multilayer-type coil component according to claim 2, wherein when viewed from the laminating direction, each of the first coil conductors does not overlap one end of one of the second coil conductors that is adjacent to the first coil conductor in the laminating direction.

18. The multilayer-type coil component according to claim 2, wherein when viewed from the laminating direction, each of the second coil conductors does not overlap one end of one of the first coil conductors that is adjacent to the second coil conductor in the laminating direction.

19. The multilayer-type coil component according to claim 1, wherein the plurality of insulating layers includes additional first insulating layers and additional second insulating layers that are interleaved in the laminating direction, each first insulating layer further includes a second coil via conductor electrically connected to the second coil, each respective first coil conductor included in each respective first insulating layer has a convex shape facing a position of the second coil via conductor included in that respective first insulating layer, and the first coil conductors included in the first insulating layers are rotationally symmetric with each other.

* * * * *